(12) United States Patent
Brierley et al.

(10) Patent No.: US 6,696,283 B1
(45) Date of Patent: *Feb. 24, 2004

(54) PARTICULATE OF SULFUR-CONTAINING ORE MATERIALS AND HEAP MADE THEREFROM

(75) Inventors: James A. Brierley, Sandy, UT (US); David L. Hill, Elko, NV (US)

(73) Assignee: Newmont USA Limited, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/991,484

(22) Filed: Nov. 9, 2001

Related U.S. Application Data

(63) Continuation of application No. 08/459,537, filed on Jun. 2, 1995, now Pat. No. 6,383,458, which is a continuation of application No. 07/851,988, filed on Mar. 13, 1992, now abandoned, which is a continuation-in-part of application No. 07/778,521, filed on Oct. 18, 1991, now Pat. No. 5,246,486, which is a continuation-in-part of application No. 07/728,126, filed on Jul. 10, 1991, now abandoned.

(51) Int. Cl.$^7$ .................................................. C12N 1/00
(52) U.S. Cl. ............................. 435/262; 423/DIG. 17; 435/252.1
(58) Field of Search ................... 423/DIG. 17, 27, 423/29; 252/1; 435/262, 243, 252.1

(56) References Cited

U.S. PATENT DOCUMENTS

| | | | |
|---|---|---|---|
| 588,476 A | 8/1897 | Rhodes | |
| 2,829,964 A | 4/1958 | Zimmerley et al. | ............ 75/104 |
| 3,169,856 A | 2/1965 | Mero | .......................... 75/119 |
| 3,305,353 A | 2/1967 | Duncan et al. | ............... 75/101 |

(List continued on next page.)

FOREIGN PATENT DOCUMENTS

| | | |
|---|---|---|
| AU | 45769 | 8/1985 |
| CA | 1122414 | 4/1982 |
| DE | 2742199 | 4/1978 |
| EP | 0 004 431 | 10/1979 |
| GB | 2180829 | 4/1987 |
| JP | 47-14602 | 5/1972 |
| JP | 54-39802 | 11/1979 |
| SA | 85-3701 | 5/1985 |
| SU | 0715483 | 2/1980 |
| SU | 943309 | 2/1980 |
| SU | 998549 | 2/1983 |
| SU | 1227701 | 4/1986 |
| SU | 1359 324 | 12/1987 |
| WO | WO92/16667 | 10/1992 |

OTHER PUBLICATIONS

Ahonen, L. et al., Catalytic Effects of Silver in the Microbiological Leaching . . . , Hydrometallurgy, 14, (1990), Elsevier Science Publ., pp. 219–236 (no month).

(List continued on next page.)

*Primary Examiner*—Steven Bos
(74) *Attorney, Agent, or Firm*—Marsh Fischmann & Breyfogle LLP

(57) ABSTRACT

Disclosed is a particulate of an ore material having a metal value metal value and a matrix material having a sulfur content wherein the sulfur is present in an oxidation-reduction state of zero or less, the particulate comprising (a) a core particle of the ore material, with the core particle having a size of less than about two inches; and (b) a layer of particles of the ore material and an inoculate of sulfur biooxidizing bacteria in admixture with the particles; wherein the particulate has sufficient strength to retain at least about 95% of a void volume for a column height of about 6 feet for at least 200 days when continuously bathed in a solution comprised of the inoculate or a nutrient therefor. Also disclosed is a heap comprising a plurality of the particulate.

13 Claims, 7 Drawing Sheets

U.S. PATENT DOCUMENTS

| | | | |
|---|---|---|---|
| 3,330,650 A | 7/1967 | Zimmerley et al. ............ 75/104 |
| 3,418,237 A | 12/1968 | Booth et al. .................. 210/54 |
| 3,433,629 A | 3/1969 | Imai et al. ...................... 75/54 |
| 3,455,679 A | 7/1969 | Mayling ...................... 75/101 |
| 3,607,235 A | 9/1971 | Duncan et al. ............... 75/101 |
| 3,660,073 A | 5/1972 | Youngs et al. .................... 75/3 |
| 3,679,397 A | 7/1972 | O'Connor et al. ............ 75/101 |
| 3,777,004 A | 12/1973 | Lankenau et al. ............ 423/20 |
| 3,819,797 A | 6/1974 | Spedden et al. .............. 423/27 |
| 3,823,009 A | 7/1974 | Lallach et al. .................... 75/3 |
| 3,860,414 A | 1/1975 | Lang et al. ....................... 75/3 |
| 3,893,847 A | 7/1975 | Derrick ........................... 75/3 |
| 3,898,076 A | 8/1975 | Ranke .............................. 75/3 |
| 3,949,051 A | 4/1976 | Pawlek ........................ 423/28 |
| 4,002,717 A | 1/1977 | Sandberg et al. ............. 423/24 |
| 4,013,606 A | 3/1977 | Ballweber et al. ... 260/29.4 UA |
| 4,017,309 A | 4/1977 | Johnson .................... 75/101 R |
| 4,021,394 A | 5/1977 | Tuka et al. .......... 260/29.4 UA |
| 4,056,261 A | 11/1977 | Darrah ....................... 266/101 |
| 4,062,817 A | 12/1977 | Westerman .......... 260/17.45 G |
| 4,070,182 A | 1/1978 | Genik-Sas-Berezowsky et al. ......... 75/103 |
| 4,076,633 A | 2/1978 | Edwards et al. ............ 252/8.75 |
| 4,128,528 A | 12/1978 | Frisque et al. ........... 260/42.55 |
| 4,162,996 A | 7/1979 | Parrini et al. ................ 260/4 R |
| 4,179,369 A | 12/1979 | Bradley et al. ............... 210/43 |
| 4,222,861 A | 9/1980 | Finch ......................... 209/166 |
| 4,222,862 A | 9/1980 | Finch ......................... 209/166 |
| 4,233,411 A | 11/1980 | Ballweber et al. .......... 525/155 |
| 4,238,330 A | 12/1980 | Fong et al. ................. 210/708 |
| 4,256,705 A | 3/1981 | Heinen et al. ................ 423/27 |
| 4,256,706 A | 3/1981 | Heinen et al. ................ 423/29 |
| 4,269,622 A | 5/1981 | Kerley, Jr. .................... 75/103 |
| 4,269,699 A | 5/1981 | McCready et al. ....... 75/101 R |
| 4,279,868 A | 7/1981 | Von Kohorn ................ 423/29 |
| 4,293,333 A | 10/1981 | Drobot ................... 75/101 BE |
| 4,293,334 A | 10/1981 | Drobot ................... 75/101 BE |
| 4,301,121 A | 11/1981 | Von Kohorn .................. 423/1 |
| 4,318,892 A | 3/1982 | Von Kohorn .............. 423/279 |
| 4,324,764 A | 4/1982 | Hasegawa et al. .......... 422/159 |
| 4,343,773 A | 8/1982 | Miller et al. .................... 423/1 |
| 4,362,559 A | 12/1982 | Perez et al. ..................... 75/53 |
| 4,369,061 A | 1/1983 | Kerley, Jr. .................... 75/103 |
| 4,374,097 A | 2/1983 | Holland ....................... 423/22 |
| 4,402,831 A | 9/1983 | Beardsmore et al. ....... 210/606 |
| 4,405,728 A | 9/1983 | Krebs et al. ................. 523/336 |
| 4,417,992 A | 11/1983 | Bhattacharyya et al. ...... 252/88 |
| 4,424,194 A | 1/1984 | Hughes .......................... 423/1 |
| 4,448,886 A | 5/1984 | Gestaut et al. .............. 435/262 |
| 4,497,778 A | 2/1985 | Pooley ........................ 423/27 |
| 4,526,615 A | 7/1985 | Johnson .................... 75/101 R |
| 4,557,905 A | 12/1985 | Sherman et al. ............. 423/27 |
| 4,571,387 A | 2/1986 | Bruynesteyn et al. ....... 435/262 |
| 4,585,548 A | 4/1986 | Cadzow et al. ................ 209/5 |
| 4,654,078 A | 3/1987 | Perez et al. ............... 75/118 R |
| 4,657,746 A | 4/1987 | Rende et al. ................ 523/402 |
| 4,690,894 A | 9/1987 | Brierley et al. ............. 435/244 |
| 4,721,526 A | 1/1988 | Elmore et al. ............ 75/118 R |
| 4,729,788 A | 3/1988 | Hutchins et al. .......... 75/118 R |
| 4,732,608 A | 3/1988 | Emmett, Jr. et al. ...... 75/101 R |
| 4,740,243 A * | 4/1988 | Krebs-Yuill et al. .......... 423/27 |
| 4,743,396 A | 5/1988 | Fong et al. ............... 252/313.1 |
| 4,751,259 A | 6/1988 | Roe et al. .................... 524/52 |
| 4,752,332 A | 6/1988 | Wu et al. ................. 75/101 R |
| 4,765,827 A | 8/1988 | Clough et al. .................. 75/2 |
| 4,767,449 A | 8/1988 | Rosen et al. ..................... 75/3 |
| 4,778,519 A | 10/1988 | Pesic ....................... 75/118 R |
| 4,789,481 A | 12/1988 | Brierley et al. ............. 210/661 |
| 4,801,329 A | 1/1989 | Clough et al. ................. 75/97 |
| 4,802,914 A | 2/1989 | Rosen et al. ..................... 75/3 |
| 4,822,413 A | 4/1989 | Pooley et al. ............. 75/118 R |
| 4,875,935 A | 10/1989 | Gross et al. ................... 75/117 |
| 4,888,293 A | 12/1989 | Hackl et al. ................ 435/245 |
| 4,898,611 A | 2/1990 | Gross ............................. 75/3 |
| 4,898,827 A | 2/1990 | Brierley et al. ............. 435/244 |
| 4,902,345 A | 2/1990 | Ball et al. ................. 75/118 R |
| 4,910,010 A | 3/1990 | Khalafalla .................. 423/508 |
| 4,960,461 A | 10/1990 | Esna-Ashari et al. ......... 423/27 |
| 4,961,777 A | 10/1990 | Perez et al. ................... 75/313 |
| 4,968,008 A | 11/1990 | Emmett, Jr. et al. ........ 266/168 |
| 4,987,081 A | 1/1991 | Hackl et al. ................ 435/262 |
| 4,992,179 A | 2/1991 | Brierley et al. ............. 210/661 |
| 5,004,786 A | 4/1991 | Fong et al. ................. 525/344 |
| 5,005,806 A | 4/1991 | Krauth ........................ 266/101 |
| 5,006,320 A | 4/1991 | Reid et al. .................. 423/150 |
| 5,021,088 A | 6/1991 | Portier ........................ 75/736 |
| 5,034,139 A | 7/1991 | Reid et al. ............... 252/8.512 |
| 5,075,390 A | 12/1991 | Fong ............................ 525/379 |
| 5,077,021 A | 12/1991 | Polizzotti ..................... 423/27 |
| 5,077,022 A | 12/1991 | Polizzotti ..................... 423/29 |
| 5,084,520 A | 1/1992 | Fong ....................... 523/329.4 |
| 5,112,582 A | 5/1992 | Polizzotti ..................... 423/27 |
| 5,127,942 A * | 7/1992 | Brierley et al. ............... 423/22 |
| 5,152,969 A | 10/1992 | Kleid et al. ................... 423/29 |
| 5,162,105 A | 11/1992 | Kleid et al. ................... 423/29 |
| 5,186,915 A | 2/1993 | Polizzotti ..................... 423/29 |
| 5,196,052 A | 3/1993 | Gross et al. .................. 75/712 |
| 5,211,920 A | 5/1993 | Polizzotti ..................... 423/29 |
| 5,244,493 A | 9/1993 | Brierley et al. ............... 75/743 |
| 5,246,486 A * | 9/1993 | Brierley et al. ............... 423/29 |
| 5,332,559 A | 7/1994 | Brierley et al. ............... 423/27 |
| 5,834,294 A * | 11/1998 | Brierley et al. ............. 435/243 |
| 6,383,458 B1 | 5/2002 | Brierley et al. ............... 423/23 |

OTHER PUBLICATIONS

Andrews, G., Large Scale Bioprocessing of Solids, Biotechnology Progress, vol. 6, pp. 225–230, 1990.

Attia, Y.A. et al., Effects of galvanic interactions of sulfides on extraction of precious metals from refractory complex sulfides by bioleaching, International Journal of Mineral Processing, 30 (1990), Elsevier Science Publ. B.V., Amsterdam, pp. 99–111 (no month).

Baldi, F. et al., Bioleaching of cobalt and zinc from pyrite ore in relation to calcitic gangue content, World Journal of Microbiology and Biotechnology, 7, 298–308, 1991, (no month).

Ballester, A. et al, The Influence of Various Ions in the Bioleaching . . . , Hydrometallurgy, 23 (1990), Elsevier Science Publ., pp. 221–235 (no month).

Bartlett, R. W., Aeration Pretreatment of Low Grade Refractory Gold Ores, Minerals and Metallurgical Processing, pp. 22–29 (Feb. 1990).

Bennett et al., Limitations on Pyrite Oxidation Rates in Dumps Set by Air Transport Mechanisms, Biohyrometallurgy, Proceedings of Jackson Hole Symposium, Aug. 13–18, 1989 Canmet (1989); pp. 551–561.

Bhappu, R. et al., Theoretical and Practcal Studies on Dump Leaching, Transactions vol. 244, Sep. 1969, pp. 307–320.

Bhattacharya, P. et al., Reaction Kinetics model for chalcopyrite . . . , Enzyme Microb. Technol. 1990, vol. 12, Nov., 1990, pp. 873–876.

Blancarte–Zurita, M.A. et al., Particle Size Effects in the Microbiological Leaching . . . , Biotechnology and Bioengineering, vol. XXVIII, pp. 751–755, May 1986.

Braddock, J.F. et al., Growth Kinetics of Thiobacillus . . . , Applied and Environmental Microbiology, Jul. 1984, vol. 48, No. 1, pp. 48–55.

Braun, R.L., et al., In–Place Leaching of Primary Sulfide Ores: . . . , Solution Mining Symposium, 1974, Aplan, F.F. et al., (eds.) Chapter 21 Proceedings of Symposium 103 AIME Annual Meeting Dallas, TX Feb. 25–27, pp. 295–323.

Brierley, Corale L., Effect of Hydrogen Peroxide on Leach Dump Bacteria, SME Trans. vol. 266, pp. 1860–1863 (1979), no month.

Brierley, Corale, et al., Metal–tolerant Micro–organisms of Hot, Acid Enviroments, G.W. Gould and J.E.L. Corry (eds.) 1980, Microbial Growth and Survival in Extremes of Environment. Society for Applied Bacteriology Tech. Series 15, Academic Press, London, pp. 39–51 (no month).

Brierley, James A., Thermophilic Iron–Oxidizing Bacteria . . . , Applied and Environmental Microbiology, vol. 36, No. 3., Sep. 1978, pp. 523–525.

Brierley, James A. et al, Microbial Mining Using Thermophilic Microorganisms, ed. Thomas D. Brock, John Wiley & Sons, Inc., Ch. 12, 1986, pp. 280–305 (no month).

Brierley, James A., Biotechnology for the Extractive Metals Industries, J. of the Minerals, Metals & Materials Society, vol. 42, No. 1, Jan. 1990, pp. 28–30.

Brierley, James, Al., Acidophilic thermophilic archaebacteria: potential application for metals recovery, FEMS Microbiology Reviews 75 (1990) pp. 287–291 (no month).

Brierley, James, A., Use of Microorganism for Mining Metals, Engineered Organisms in the Environment: Scientific Issues, Proceedings of a Cross–Disciplinary Symposium Held in Philadelphia, PA Jun. 10–13, 1985, pp. 141–146.

Brierley et al., Enhanced Recovery of Gold From a Refractory Sulfidic–Carbonaceous Ore Using Bacterial Pretreatment and Thiourea Extraction, Proceeding Gold 1990 Symposiom in Salt Lake City, Utah, Feb. 26 to Mar. 1, 1990, pp. 463–466.

Bruynesteyn A. et al., Microbiological leaching of sulphide concentrates, Canadian Metallurgical Quarterly, vol. 10, No. 1, 57–63 (no date).

Bruynesteyn A. et al., The BiotankLeach Process; Gold 100, Proceedings of the International Conference on Gold, vol. 2: Extractive Metallurgy of Gold Johnannesburg, SAIMM, 1986 (no month), pp. 353–364.

Budden, J. et al., Considerations in the Monitoring of a Moderately Thermophilic Culture in the Oxidation of Refractory Gold Ores and Concentrates, The Minerals, Metals & Materials Society, 1990, 315–322 (no month).

Burbank et al., Bioxidation of Refractory Gold Ore in Heaps, Proceedings Gold Tech 4, Reno, Nev., Sep. 10–12, 1990, Ch. 16, pp. 151–159.

Bustos et al.: Bacterial Thin Layer Leaching of Cooper Sulphide Ore; Editors: Cooper et al., Proceedings of the Copper 91, Cobre 19 International Symposium, vol. III; Ottawa, Canada, Pergemon Press, New York, pp. 87–97, 1991, no month.

Bustos, S., The Sociedad Mineral Pudahuel Bateria Thin–Layer Leaching Process at Lo Aguirre, FEMS Microbiology Reviews, vol. 11, 1993, pp. 231–235, no month.

Butler, B.J. et al., The Effect of Particle Size and pH on the Removal of Pyrite From Coal by Conditioning with Bacteria Followed by Oil Agglomeration, Hydrometallurgy, 15, (1986), 325–336, Elsevier Science Publ. B.V. Amsterdam (no month).

Carranza, F., et al., Selective Cyclic Bioleaching of a Copper–Zinc Sulphide Concentrate, Hydrometallurgy 24, (1990) Elsevier Science Publ., pp. 67–76 (no month).

Chamberlin, P.D., Agglomeration: Cheap insurance for good recovery when heap leaching gold and silver ores, Mining Engineering, Dec., 1986, pp. 1105–1109.

Chander, S. et al., Kinetics of Pyrite Oxidation, Society of Mining Engineers, for presentation at the SEM–AIME Annual Meeting Denver, CO Feb. 23–27, 1987 (Preprint No. 87–150), pp. 1–7.

Chaudhury, Roy, G. et al., Utilisation of Low–Grade Pyrites . . . , International Journal of Mineral Processing, 26 (1989), pp. 275–284 (no month).

Colmer, A. et al., The Role of Microorganisms in Acid Mine Drainage: . . . , Science, Sep. 19, 1947, pp. 253–256.

Crundwell, F.K., The influence of the electronic structure of solids on the anodic dissolution and leaching of semiconducting sulphide materials, Hydrometallurgy, 21, (1988), 155–190 (no month).

Datta, T.K., et al., Pretreatment of Chalcopyhrite ore . . . , Minerals Engineering, vol. 3, No. 6, 1990, pp. 641–644 (no month).

Davis, G.B. et al., A model of oxidation in pyritic mine wastes: part 1 equations and approximate solution, Appl. Math. Modelling, vol. 10, Oct. 1986, 314–322.

Debus, Keith, Mining wtih Microbes, Technology Review, Aug./Sep. 1990, pp. 51–57.

Deepak, D. et al., Bioleaching of Copper from a Low–grade Chalcopyrite Ore, J. Chem. Tech. Biotechnol. (1981), vol. 31, No. 6, pp. 358–361 Jun.

Dempsey, P. et al., Bacterial Oxidation at Vaal Reefs, International Deep Mining Conference: Innovation in Metallurgical Plant, Johannesburg (SAIMM), (1990) 111–123 (no month).

Dix, R. B., Laboratory Heap Leach Testing: How Small and Large Scale Tests Compare, Mining Engineering, Jun. 1989, pp. 440–442.

Duncan, D.W., Biological Leaching of Mill Products, Joint Meeting of the B.C. Section and Merrit Branch, C.I.M., Merritt, B.C. Oct., 1965, Transactions vol. LXIX, 1966, pp. 329–333.

Dutrizac, J.E. et al., Ferric Ion as a Leaching Medium, Minerals Sci. Engng. vol. 6, No. 2, Apr., 1974 pp. 59–100.

Dutrizac, J.E. et al., Percolation Leaching of Pentlandite Ore, Can. Min. & Met. (CIM Bulletin) Mar. 1974, vol. 67., 169–175.

Foo, K.A. et al., Oxygen Utilization in Emerging Refractory Gold Ore Processes, Gold & Silver Recovery Innovations, Sacramento, CA, Nov. 10–11 1989, pp. 47–51.

Ghiani, M. et al., Use of Bacteria in Mineral Processing, Society of Mining Engineers, SME Annual Meeting Denver, CO Feb. 24–27, 1987 (Preprint No. 87–18), pp. 1–8.

Gilbert, S.R. et al., Comparative economics of bacterial oxidation and roasting as a pretreatment step for gold recovery form an auriferous pyrite concentrate, CIM Bulletin, vol. 81, No. 910, Feb., 1988, pp. 89–94.

Gooding, K., Miners Bitten by the Gold Bug, Technology, Jan. 11, 1994.

Greene, John W., Microbial Column Leaching of a Refractory, Carbonacous Gold Ore, Randol Gold Forum 1990, Squaw Valley, Calif., Sep. 13–15, 1990, pp. 89–92.

Guay, R. et al., Ferrous Iron Oxidation and Uranium Extraction . . . , Biotechnolgy and Bioengineering, vol. XIX, pp. 727–440 (1977) (no month).

Guedes de Carvalho, R.A. et al., Bioleaching of Tungsten Ores, Hydrometallurgy, 24, (1990) Elsevier Science Publishers BV Amsterdam, pp. 263–267 (no month).

Hackl, Ralph P. et al., Operation of a commerical–scale bioleach reactor at the Congress gold property, Proceedings of the Symposium at GoldTech 4, Reno, NV, Sep. 10–12, 1990, Fuersterun & Hendrix, (eds), pp. 131–141.

Hackl, Ralph et al., Scaleup Experiences in Bio–oxidation of Refractory Gold Ores and Concentrates, Gold & silver Recovery Innovations, Sacramento, CA No. 10–11, 1989, pp. 58–62.

Hackl, R., What to be Aware of in Cyanidation of Bio–Oxidized Products, Gold & Silver Recovery Innovations, Sacramento, CA., Nov. 10–11, 1989, pp. 143–144.

Haines, A.K. et al., Process and Engineering Challanges in the Treatment of Refractory Gold Ores, Keynote Address, International Deep Mining Conference: Innovations in Metallurgical Plant, Johannesburg, SAIMM (1990) pp. 103–110 (no month).

Hansford, G.S., et al., The Logistic Equation For Modelling . . . , Minerals Engineering, vol. 5, No. 10–12, pp. 1355–1364, 1992 (no month).

Hanson, James S., Kinetic model of the bacterial leaching of chalcopyrite concentrates, Biotechnology in Minerals and Metal Processing, Department of Materials Science and Mineral Engineering, University of California at Berkeley, Berkeley, CA, Chapter 4, 25–29, no date.

Herrera, M.N., A Phenomenological Model of Bioleaching of Complex Sulfide Ores, Hydrometallurgy, vol. 22, 1989, pp. 193–206.

Holmes, D.S., Biotechnology in the mining and metal processing industries: challenges and opportunities, Minerals and Metallurgical Processing Paper 88–644, May, 1988 pp. 49–56.

Huber, Harald et al., Thiobacillus cuprinus sp. nov., . . . , Applied and Enviromental Microbiology, Feb. 1990, vol. 56, No. 2, pp. 315–322.

Hutchins, S.R. et al., Microorganisms in Reclamation of Metals, Ann. Rev. Microbiol. 1986, 40: pp. 331–336 (no month).

Hutchins, S.R., et al., Microbial Pretreatment of Refractory Sulfide and Carbonaceous Ores Improves the Economics of Gold Recovery, Mining Engineering, Apr. 1988, pp. 249–254.

Ivanov, V.N. et al., Effect of Ferric Ions on Oxidation of Ferrous Oxide by Thiobacillus ferrooxidans, Plenum Publishing, 1988, (no month). D.K. Zabolotnyl Institute of Microbiology and Virology, Academy of Sciences of Ukrainian SSR, Kiev. Translated from Mikrobiologiya vol. 56, No. 6, pp. 724–728, Nov.–Dec., 1987.

Jyothi, N. et al., Electrochemical Aspects of Selective Bioleaching . . . , International Journal of Mineral Processing, 27, (1989), Elsevier Science Publishers BV Amersterdam, pp. 189–203 (no month).

Karabelas, Anasasius J., Use of asymptotic relations to correlate mass transfer data in packed beds, Chemical Engineering Science, 1971, 26, 1581–1589 (no month).

Komnitsas, C. et al., Bacterial Oxidation of an Arsenical Gold Sulphide Concentrate from Olympias, Greece, Minerals Engineering, vol. 3, No. 3/4, pp. 295–306, 1990, (no month).

Kontopoulos et al., Process Options for Refractor Sulfide Gold Ores: Technical, Enviromental, and Economic Aspects, Proceedings EPD '90 Congress, D.R. Gaskell, Editor, The Minerals, Metals & Materials Society, 1990, pp. 393–412 (no month).

Kurtz, Jeffrey P., et al., Clay Problems Encountered in Gold Heap Leaching, Manuscript submitted to Society of Mining Engineers for the Symposium on "Small Mines Devolopment in Precious Metal" Aug. 30–Sep. 2, 1987, Reno, NV, pp. 1–17.

Larsson, Liselotte et al., Pyrite Oxidation by Thermophilic Archaebacteria, Applied and Enviromental Microbiology, Mar., 1990, vol. 56, No. 3, pp. 697–701.

Lastra, R., Mineralogical Examination of the Bacterial Leaching Progress on Base–Metal Sulphide, Society of Mining, Metallurgy, and Exploration, Inc. for presentation at 1991 SME Annual Meeting, Denver, CO Feb. 25–28, 1991 (Preprint No. 91–57) pp. 1–6.

Lawrence, R.W., The Potential of Thermophillic Bateria in the Pretreatment of Refractory Gold Ores, Annual. Meeting of Biominet, Laurentian University, Sudbury, Ontario, Canada, Nov. 3, 1987, pp. 1–16.

Lawrence, R.W. et al., Biochemical Pretreatment in Arsenical Gold Ore Processing, Arsenic Metallurgy Fundamentals and Application, Reno, Nev., Jan. 1988, pp. 199–211.

Lawrence, W.R., Heap Leaching of Gold Ores, An Investor's Guide to the Mining Industry, Mar. 4, 1991, pp. 1–9.

Lawson, E.N., et al., Biological Pre–Treatment for the Recovery of Gold From Slimes Dams, Journal of the South African Institute of Mining and Metallurgy, Feb. 1990, pp. 45–49.

Livesey–Goldblatt, E., Bacterial Leaching of Gold, Uranium, Pyrite Bearing Compacted Mine Tailing Slimes, (Lawrence, Richard W., Editor) Sixth International Symposium on Biohydrometallurgy, Vancouver, B.C., Canada, Aug. 21–24, 1985, pp. 89–96.

Lizama, Hector M., et al., Bacterial Leaching of a Sulfide Ore . . . , Hydrometallurgy, 22 (1989) (no month) Elsevier Science Publishers B.V., Amsterdam, pp. 301–310.

Lizama, Hector M., et al., Rate Equations and Kinetic Parameters . . . , Applied and Enviromental Microbiology, Nov., 1989, p. vol. 55, No. 11, pp. 2918–2923.

Marchant, P. Brad, Cost Benefit Considerations for Innovative Applications of Biohydrometallurgy, Gold & Silver Recovery Innovations, Sacramento, CA, Nov. 10–11, 1989, pp. 115–121.

Marias, H.J., Bacterial Oxidation of Arseno–Pyritic Refractory Gold Ore: Barberton Mines'Answer to Pollution Control, International Deep Mining Conference: Innovations in Metallurgical Plant. Johannesburg, SAIMM, 1990, pp. 125–129 (no month).

McClelland, G.E. et al., Agglomeration and Heap Leaching of Finely Ground Precious–Metal–Bearing Tailings, U.S. Dept. of the Interior, Bureau of Mines, Information Circular 9034, U.S. GPO: 1985–505–019/20,084 (1985), (no month), pp. 1–11.

Mihayolv, B.V. et al., Biooxydation of a Sulfide Ore in Columns, Mineral Bioprocessing, Proceedings of the conference Mineral Bioprocessing held in Santa Barbara, CA Jun. 16–22, 1991, ed. Smith et al., pp. 163–177.

Miller, Tim, Bio–Oxydation of Heap Leach Grade Sulfide Ore at Mesquite, Presented To NMA/UMA Symposium, Sep. 6, 1988, pp. 1–13.

Moffat, A.S., Microbial Mining Boosts the Environment, Bottom Line, Science vol. 264, May 6, 1994, pp. 778–779.

Murr, L.E., Theory and Practice of Copper Sulfide Leaching in Dumps and In–Situ, Minerals Science Engineering, vol. 12, No. 3, Jul. 1980, pp. 121–189.

Murthy, D.S.R., Microbially enhanced thiurea leaching of gold and silver from lead–zinc sulfide flotation tailings, Hydrometallurgy, 25 (1990) pp. 51–60 (no month).

Neeling, G. et al., Enhanced Gold Extraction by Bio–Oxidation, Gold & Silver Recovery Innovations, Phase IV Workshop, Sacramento, CA, Nov. 10–11, 1989, pp. 347–348.

Neuberg, H.J. et al., A model for the bacterial leaching of copper sulfide ores in pilot–scale columns, International Journal of Mineral Processing, 31, (1991), pp. 247–264, Elsevier Science Publ. BV Amsterdam (no month).

Norris, P.R., Dissolution of Pyrite . . . , FEMS Microbiology Letters 4, (1978), pp. 143–146 (no month).

Okerke, A. et al., Kinetic of Iron Oxidation by Thiobacillus ferroxidans: Applied and Environmental Microbiology, vol. 57, No. 4, Apr., 1991, pp. 1052–1056.

Ollivier, P. et al., Gold Liberation and Environmental Aspects of Bio–Oxydation Treatment of Refractory Gold Ores, SME Annual Meeting, Salt Lake City, Utah Feb. 26–Mar. 1, 1990, pp. 1–9.

Olson, G. et al., Rate of Pyrite Bioleaching by Thiobacillus ferroxidans: Results of an Interlaboratory Comparison, Applied and Environmental Microbiology, vol. 57, No. 3, Mar., 1991, pp. 642–644.

Palencia, I. et al., The Electrochemical Behavior of a Semiconducting Natural Pyrite in the presence of Bacteria, Metallurgical Transaction B, vol. 22B, Dec., 1991, pp. 765–774.

Parkinson, Gerald, Metals recovery makes big splash in Canada, Chemical Engineering, Sep. 30, 1985, pp. 19–24.

Phariss, Ed et al., Particle Agglomeration and Heap Leaching: A New Technology for Processing Low–Grade Gold and Silver Ore, Dames & Moore, Engineering Bulletin 59/Apr., 1982, pp. 33–38.

Pooley, F.D., Use of Bacteria to Enhance Recovery of Gold From Refractory Ores, International Symposium Innovative Plant and Processes for Minerals Engineering, Minprep 1987, pp. 1–16 (no month).

Razzell, W.E., et al., Isolation and Properties of an Iron–Oxidizing Thiobacillus, J. of Bacteriol, vol. 85, No. 3, pp. 595–603, Mar. 1963.

Riley, R.P. et al., Development of the VELMIX Bio–Oxidation Reactor, International Deep Mining Conference: Innovations in Metallurgical Plant, Johannesburg, SAIMM, (1990), pp. 131–140 (no month).

Sand, Wolfgang, Ferric iron reduction by Thiobacillus ferrooxidans at extremely low pH–values, Biogeochemistry 7, 1989, Kluwer Academic Publishers, pp. 195–201.

Sitarski, John, et al., Bioleaching: Bioreactor Design Issues, Gold & Silver Recovery Innovations, Sacramento, CA, Nov. 10–11, 1989, pp. 145–147.

Sohn, H.Y., Rate Process of Extractive Metallurgy, Plenum Press, New York, 191–197 (1979), (no month).

Southwood, A.J., Mintek Report No. M191, The Agglomeration of Fine Material For Bacterial Heap Leaching, Mar. 25, 1985, Council for Mineral Technology, Randburg, South Africa, pp. 1–36.

Spencer et al., Metallurgical Considerations . . . , Gaskell (ed.), EPD Congress '90, Proceedings of a symposium sponsored by the Extraction and Processing Division, and held at the TMS Annual Meeting in Anaheim, CA Feb. 19–22. 1990, pp. 295–303.

Suttill, Keith, R. Bio–Oxydation for Refractory Gold: Bio–Oxydation comes one step closer to full–scale commerical operation, vol. 190, E & MJ, Sep., 1989, pp. 31–32.

Suzuki, I., et al., Competitive Inhibition of Ferrous Iron . . . , Applied and Environmental Microbiology, May, 1989, vol. 55, No. 5., pp. 1117–1121.

Taylor, J.H. et al., The Leaching of Cupreous Pyrites and the Precipitation of Copper at Rio Tinto, Spain, Bull. The Inst. of Mining & Metallurgy, No. 457, Nov., 1942, pp. 1–36.

Tsuchiya et al., Microbial Mutualism in Ore Leaching, Biotechnology and Bioengineering vol. XVI, (1974), pp. 991–995 (no month).

Tuovinen, O. H. et al., Mixed Cultures in Biological Leaching Process . . . , Chapter 13, Zeikus, J.G. et al. (eds)., McGraw–Hill, New York, 1991, pp. 373–427 (no month).

Tuovinen, O.H. et al., Use of Micro–Organisms for the Recovery of Metals, International Metallurgical Reviews, vol. 19, 1974, pp. 21–31 (no month).

van Aswegan, P.C., et al., Developments and Innovations in Bacterial Oxidation of Refractory Ores, for presentation at 1991 SME Annual Meeting, Pre–Print #91–75, Denver, CO Feb. 25–28, 1991, 1–12.

Vargas, T. et al., The Catatlytic Role of Thiobacillus Feroxidans in the Leaching of Pure Natural Chalcopyrite, Gaskell, D.R. (ed.) EPD Congress, Proceedings of a symposium sponsored by the Extraction and Processing Division, TMS Annual Meeting Anaheim, CA Feb. 19–22–1990.

von Michaelis, Hans, Innovative Refractory ore Treatment Processes, Gold & Silver Recovery Innovations, Sacramento, CA, Nov. 10–11, 1989, pp. 39–46.

White, Lane, Treating refractory gold ores, Mining Engineering, Feb., 1990, pp. 168–174.

Yopps, D.L., et al., Recovering Platinum Group Metals from Stillwater Complex Flotation Concentrate by Bioleaching, Reno Research Center, U.S. Bureau of Mines, Reno, NV., Preprinting at the 1991 SME Annual Meeting, Biotechnology in Mineral Processing Session, Denver, CO., Feb. 25–28, 1991 and preprinting at the 1991 TMS Annual Meeting New Orleans, LA, Feb. 17–21, 1991, pp. 4–25.

* cited by examiner

PARTICULATE OF SULFUR-CONTAINING ORE MATERIALS AND HEAP MADE THEREFROM

CROSS-REFERENCE TO RELATED APPLICANTS

This application is a continuation of U.S. patent application Ser. No. 08/459,537 filed Jun. 2, 1995 (now U.S. Pat. No. 6,383,458, which is a file wrapper continuation of U.S. patent application Ser. No. 07/851,988 filed Mar. 13, 1992 (now abandoned), which is a continuation-in-part of U.S. patent application Ser. No. 07/778,521 filed Oct. 18, 1991 (now U.S. Pat. No. 5,246,486), which is a continuation-in-part of U.S. patent application Ser. No. 07/728,126 filed Jul. 10, 1991 (now abandoned), the contents of all of which are incorporated herein by reference as if each were set forth herein in full.

THE INVENTION

This invention relates to recovery of precious metals, e.g. gold and silver, from ores having a sulfidic sulfur and/or elemental sulfur content, such as sulfide-containing leachable ores of the pyritic, arsenopyritic, or arsenian pyrite type, refractory carbonaceous sulfide ores which have been pretreated, ores which are being post-treated, tailings, previously considered waste grade ores (which still have sufficiently high gold and silver content) and overburden ores having fairly low gold content and which may be considered waste ores.

This invention also relates to the recovery of non-precious metal values from ores having a sulfidic and/or elemental sulfur content whether as an incident to the recovery of precious metals or as a recovery of the nonprecious metals.

More particularly this invention relates to a specific treatment of particularly prepared ores of vast quantities and typically leached in heaps, dumps, tailing dumps, or waste dumps and the like. Still more particularly this invention relates to an ore treatment which starts with a preparation of particulates of specific design characteristics making the recovery of precious metals in low amounts and/or the recovery of nonprecious metals especially attractive and suitable for a heap or dump leaching, a construction of these specifically inoculated particulates and a heap or dump constructed from the specifically inoculated particulates suitable to an outstanding degree for biooxidation reactions with either single, mixed, layered, or staged biooxidant bacteria cultures.

Further, this invention relates to especially suitable form of a biooxidized and treated ore used in subsequent downstream precious metal extractions such as by thiourea, or, after heap reconstruction, by thiosulfate or cyanide extraction of the precious metal values in the ore heap or in subsequent downstream nonprecious metal extractions, such as by suitable lixiviants, of the desired metal value(s) in the ore heap. Foremost amongst the ores being treated for precious metal recovery are gold ores. Foremost amongst the ores being treated for nonprecious metal recovery are copper, zinc, nickel, molybdenum, cobalt and uranium ores.

BACKGROUND FOR THE INVENTION

Typically precious metal containing ores are leached with cyanide as the most efficient leachant or lixiviant for the recovery of precious metal values from the ore. It would also be highly desirable to recover nonprecious metal values by heap leaching or lixiviation.

However, because of the mineralogy of various ores, access to the precious and/or nonprecious metal in the ore by cyanide or other lixiviant is low for an economical extraction of the precious metal and/or nonprecious metal values in an ore. If the cyanide extraction produces small or negligible amounts of gold, an ore is said to be refractory or highly refractory. Various methods have been employed to increase the extractability of the precious and/or nonprecious metals. A good summary article describing the prior problems is that authored by Kantopoulos et al., *Process Options for Refractory Sulfide Gold Ores: Technical, Environmental, and Economic Aspects*, Proceedings EPO '90 Congress, D. R. Gaskell, Editor, The Minerals, Metals & Materials Society, 1990.

A typical component which causes the refractoriness of the ore is predominantly a carbonaceous type component either inorganic or organic. The organic carbonaceous materials are also classified as acid insoluble carbonaceous materials. Gold found in ores dispersed within or occluded in a sulfide matrix may be considered refractory because of inaccessibility of such gold by cyanide leaching. Similarly, nonprecious metal values found in ores either dispersed within or occluded in a sulfide matrix or present as metal sulfides are also not readily recoverable by heap leaching or lixiviation.

When treating such ores, the economic considerations dictate the selection of the process or the pretreatment of the ore to render it amenable first and foremost to cyanide extraction even though other gold lixiviants may be used. Similarly, it is highly desirable with nonprecious metal values in sulfidic ores to render them recoverable by heap leaching or lixiviation.

As one of the desired treatment steps prior to cyanidation or comparable lixiviation, roasting of ores in presence of air is typical. Lately oxygen or oxygen and air roasting, at low temperatures, have showed considerable promise. Other commercial ore treatment methods prior to cyanidation are high pressure oxygen and/or oxygen-ozone pretreatment, chlorine pretreatments, hypochlorite pretreatments and the like.

To improve cyanidation of ores, during such cyanidation ozone, or ozone and oxygen, or oxygen, or a surfactant, or combinations of these are also employed. In the instance of gold recovery, methods such as "carbon-in-pulp" (or "CIP") and "carbon-in-leach" (or "CIL") are used to improve cyanidation reactions and gold recovery.

However, cyanidation has certain shortcomings, primarily an ore material must be neutralized after an acid generating treatment as cyanidation must be carried out on the alkaline side of the pH scale; likewise high cyanide consumption renders a process less attractive. When using thiourea, neutralization of the ore is not as demanding and does not affect thiourea extraction of gold, but the extraction economies are impaired by the higher cost of thiourea and the reduced efficiency when compared with cyanide.

Other compounds which have been used and offer promise because of reagent costs are compounds such as thiosulfates of which ammonium thiosulfate is one of the desirable candidates. Although still other materials are used for gold recovery, these are not yet of industrial significance.

When ammonium thiosulfate and the like are used, neutralization of ore is required as appropriate pH ranges are neutral to alkaline, e.g. to about pH 7 to 10 and preferrably to at least about 9. As pyritic sulfidic ores and many other ores need to be neutralized because of the acidity of these ores when subjected to oxygenation or biooxidation and like treatments, separate process steps are required.

Inasmuch as gold is occluded in the sulfide matrix of the ore, the accessibility by cyanide has sought to be improved for these ores; the same is also true when considering an appropriate sulfide, e.g., pyrite for oxidation or biooxidation. Although various oxidation or biooxidation reactions have been tried such as vat, autoclave, slurry or liquid solution oxidations, these reactions are not practical when using large ore bodies having low gold content. As one of the approaches to oxidation of low content metal sulfide ores, biooxidation has come into prominence and much effort has been expended in research. Biooxidation was first applied to copper. Biooxidation of copper ore has been a well tried method although it is considered fairly slow.

When biooxidation is coupled with oxidative bioleaching, i.e. when direct, indirect and even galvanic leaching reactions are involved, some of the disadvantages of the slow biooxidation reactions are mitigated. Biooxidation reactions typically involve arsenopyritic and pyritic iron sulfide-containing ores including those that have some refractory carbon components present. Biooxidation, however, can suffer from inhibitory concentrations of some metals present in the ore. Biocidically active metals are such as arsenic, antimony, cadmium, lead, mercury, molybdenum. Ions such as chlorine, bromine and the like affect the biooxidation processes. Because of slow growth rates for some bacteria as well as temperature variations in a typical ore dump undergoing sulfide oxidation, considerable efforts have been expended to improve the rate constraints which have limited or held back the potentially very useful application of biooxidation.

Hence, considerable investigation has been made of the various limiting conditions concerning commercial biooxidation including such factors as ores in heaps or in slurry form, the use of surfactants, the use of potentiators or biooxidation promoters such as silver, aluminum, etc., appropriate selection and growing of robust bacteria which would be resistant to the inhibitory biocide activity of metals such as arsenic and growing the bacteria in profuse amounts. Other considerations have been such as nutrient access, air access and carbon dioxide access for making the process even more efficient and thus an attractive ore treatment option. References illustrating these efforts are such as by Bartlett, *Aeration Pretreatment of Low Grade Refractory Gold Ores*, Minerals and Metallurgical Processing, pp 22–29, (February 1990); Bennett et al, *Limitations on Pyrite Oxidation Rates in Dumps Set By Air Transport Mechanisms*, Biohydrometallurgy, Proceedings of Jackson Hole Symposium, Aug. 13–18, 1989 Canmet (1989); Burbank et al, *Biooxidation of Refractory Gold Ore in Heaps*, Ch. 16, pp 151–159 in *Advances in Gold and Silver Processing*, Reno Proceedings of Symposium "Goldtech 4", Reno, Nev., Sep. 10–12, 1990, Society of Mining, Metallurgy and Exploration, Publisher, 1990; Dix, *Laboratory Heap Leach Testing: How Small and Large Scale Tests Compare*, Mining Engineering, June 1989, Pages 440–442.

Amongst the methods seeking to improve biooxidation many methods have been proposed for mechanically increasing the access of the biooxidant bacteria to the ore. These methods have relied upon agitation of the ore either in tanks, slurries, providing circulation in vessels or reconstitution and remixing of the materials including stirring, raking, forming an improved slurry, transfer of slurry materials, providing stirred tank basins or have addressed various aspects of heap construction and utilization. References to such considerations are found in an article by Andrews, *Large-Scale Bioprocessing of Solids*, Biotechnology Progress, Vol. 6, pp 225–230, 1990.

Patents which illustrate some of these methods mentioned above are found such as in U.S. Pat. No. 4,324,764 concerning mechanical distribution of ores or distribution of ores by conveyors such as in U.S. Pat. No. 4,571,387 or a change in heap structure such as in U.S. Pat. No. 4,279,868 or stagewise heap formation such as in U.S. Pat. No. 4,017,309; or a stirred tank—semi "heap" construction such as disclosed in U.S. Pat. No. 4,968,008.

However, when treating large amounts of waste heap material or tailing material, the normal considerations that are applicable in high grade precious metal ore treatments are not viable. For waste ore treatment, economics often dictate a one-shot type of heap formation, e.g. for the depth, the size, the reactant accessibility, etc. Moreover, for biooxidation, the induction times concerning biooxidants, the growth cycles, the biocide activities, viability of bacteria and the like become important because the variables such as accessibility, particle size, settling, compaction and the like are economically irreversible once a heap has been constructed as such heaps cannot be repaired except on a very limited basis. For example, compaction problems such as are encountered in heap treatment of ores, and others such as puddling, channelling, or nutrient-, carbon dioxide-, or oxygen-starving, uneven biooxidant bacterial distribution, and the like have been addressed in a number of investigations with respect to biooxidation. Such problems are also encountered in cyanide leaching.

For example, to solve channelling in percolation leaching by cyanides it is known to agglomerate the ore materials of high grade ores such as disclosed in U.S. Pat. Nos. 4,256,705 and 4,256,706. Other approaches to improve percolation leaching by cyanides include addition of fines such as flocculating materials, fibers, wood, pulp and the like as disclosed in U.S. Pat. No. 4,557,905. The last patent discloses leachable matrix formation to allow for access of cyanide to the precious metal values.

An ultimate, albeit impractical, suggestion for cyanide leaching has been found in U.S. Pat. No. 4,424,194 which shows making useful articles and then leaching these. This patent may have as its progenitor the early U.S. Pat. No. 588,476 of Aug. 17, 1887, which discloses porous casts made of gold "slimes" and gypsum. These casts are thereafter broken and leached.

Although for a variety of different reasons agglomeration has been practiced in the metallurgical arts such as in high temperature blast furnace art for various feed material preparations for blast furnaces, opposite suggestions have also been found concerning non-agglomeration and extraction of metals such as the pulp-liquid extraction described in U.S. Pat. No. 3,949,051. Extraction of the precious metals from heaps, preformation of heaps and heap treatment is found such as in U.S. Pat. Nos. 4,017,309 and 4,056,261.

Further improvements for access of cyanide to the precious metals have been described in U.S. Pat. No. 4,318,892 and 4,279,868 as well as U.S. Pat. No. 4,301,121. All of these attempts have sought to improve the distribution of the leachant or the mixing ratios of the ore to the lixiviant, but these attempts are typically addressed to providing better access for cyanide and to overcome the ostensible refractoriness of the ore. Other like disclosures have been found in U.S. Pat. Nos. 4,324,764 and 4,343,773.

Heap improvements have been found in the construction of the particles such as paste formation with the lixiviant and subsequent ageing of the ore on treatment of the same, described in U.S. Pat. No. 4,374,097. Likewise, specific berm construction for the improved extraction of liquids from a specifically constructed heap has been found in U.S. Pat. No. 4,526,615. Similarly various particle specifications have been described for the ore particle treatment including the micro agglomerates of a size of 500 microns (and lower) found in U.S. Pat. No. 4,585,548.

Examples of some embodiments of the invention are as follows:

A first exemplary embodiment of the invention is a particulate of an ore material having a metal value and a matrix material having a sulfur content wherein the sulfur is present in an oxidation-reduction state of zero or less comprising a. a core particle of said ore material, said core particle having a size of less than about two inches; and b. a layer of particles of said ore material and an inoculate of sulfur biooxidizing bacteria in admixture with said particles wherein said particulate has sufficient strength to retain at least about 95% of a void volume for a column height of about 6 feet for at least 200 days when continuously bathed in a solution comprised of said inoculate or a nutrient therefor.

In a variation of the first exemplary embodiment, the layer of particles have at least 100 sq. cm of surface area for a volume of about 100 cubic centimeters.

In a variation of the first exemplary embodiment, the core particle has a mean average diameter of about ½ to about ¾ inches, and said inoculate comprises an inoculate solution, comprising about 8 to 12% of the total weight of said particulate.

In a variation of the first exemplary embodiment, the particles of the ore comprise crushed ore passing a screen of ½ inch mesh size. In a further variation, said crushed ore has admixed thereto at least 1% to 5% by weight of a slime, on a dry basis, for forming a layer on said core particle.

In a variation of the first exemplary embodiment, the particulate comprises at least about $10_5$ to $10_9$ bacteria per milliliter of inoculate for said particulate. In a further variation, the bacteria is a mixture of *Thiobacillus ferroxidans* and *Thiobacillus thiooxidans*.

A second exemplary embodiment is a heap comprising a plurality of particulates of an ore material having a metal value and a matrix material having a sulfur content wherein the sulfur is present in an oxidation-reduction state of zero or less, each said particulate comprising a. a core particle of said ore material, the core particle having a size of less than about two inches and b. a layer of particles of said ore material and an inoculate of sulfur-biooxidizing bacteria in admixture with said particles wherein each of said particulate has sufficient strength to retain at least about 95% of a void volume for a column height of about 6 feet for at least 200 days when continuously bathed in a solution comprised of said inoculate or a nutrient therefor.

In a variation of the second exemplary embodiment a core of said heap is constructed of particulates with a bacterial inoculant of *Sulfobacillus thermosulfidooxidans*, or *Sulfolobus acidocaldarius, Sulfolobus* BC, *Sulfolobus solfataricus* or *Acidanus brierleyi*.

In all of these heap formations, heap treatments or heap leaching methods, shortcomings have been sought to be overcome by the increase of cyanide efficiency such as by oxygen addition, e.g. in U.S. Pat. No. 4,721,526, or the use of various liquors in the recovery of gold described in U.S. Pat. No. 4,822,413.

Agglomerating agents for copper ores are shown in U.S. Pat. No. 4,875,935. Opening up clogged heaps has also been shown and discussed in U.S. Pat. No. 3,819,797 and heap treatment for distribution of a lixiviant is disclosed in U.S. Pat. No. 5,005,806. Finally, both conjoint crushing and agglomeration of ore has been discussed in U.S. Pat. No. 4,960,461.

BRIEF DESCRIPTION OF THE INVENTION

The present invention relates to an improvement for the recovery of desired metal value(s) from an ore material comprising those desired metal value(s) and a matrix material having a sulfur content wherein the sulfur is present in an oxidation-reduction state of zero or less, but more typically such as sulfidic and/or elemental sulfur. The process of the present invention comprises a. optionally adjusting the pH of the ore material to a pH of less than 2.5, separately or conjointly with acid solution caused partial agglomeration, b. forming particulates from particles of the ore material with an inoculate comprising microbial agent(s) capable of at least partially biooxidizing the sulfur content, c. forming a heap of said particulates, d. biooxidizing the sulfur content in the matrix and e. recovering the desired metal value(s) either from the biooxidizing solution leachant or a specific leachant for the desired metal value.

The present invention further relates to said particulates and to heaps formed of said particulates. The terms "ore" or "ore material" as used herein includes not only ore per se, but also concentrates, tailings or waste in which sufficient metal values exist to justify recovery of those values.

The desired metal value(s) may be selected from

Group IB metals of the periodic table of elements (CAS version)
(copper, silver, and gold);

Group IIB metals
(particularly zinc);

Group IV A metals
(germanium and lead, particularly lead);

Group VA metals
(particularly arsenic and antimony);

Group VIB metals
(chromium, molybdenum and tungsten, particularly tungsten);

Group VIII metals
(iron, ruthenium, osmium, cobalt, rhodium, iridium, nickel, palladium and platinum, particularly, nickel, palladium and platinum) and The Actinide series metals
(particularly uranium).

Preferred among these metals are copper, silver, gold, zinc, cobalt, nickel and uranium.

The matrix material, in addition to having the described sulfur content, may comprise one or more inorganic metallosulfur compounds in which the sulfur moiety conforms to the description of the sulfur content and the metal moiety comprises a metal as previously described. Examples are as follows:

| | |
|---|---|
| Arsenopyrite | $FeA_5S$ |
| Bornite | $Cu_2FeS_4$ |

| | |
|---|---|
| -continued | |
| Chalcocite | $Cu_2S$ |
| Cobaltite | $CuFeS_2$ |
| Enargite | $Cu_3AsS_4$ |
| Galena | $PbS$ |
| Greenockite | $CdS$ |
| Millerite | $NiS$ |
| Molybdenite | $MoS_2$ |
| Orpiment | $As_2S_3$ |
| Pentlandite | $Ni_9S_8$ |
| Pyrite | $FeS_2$ |
| Pyrrhotite | $Fe_{1-0.8}S$ |
| Sphalerite | $ZnS$ |
| Stibnite | $Sb_2S_3$ |

In this context, the desired metal value(s) may be present in the ore material either as
1. an elemental metal, such as gold, dispersed within or occluded in the matrix material;
2. a compound, such as a metal oxide, dispersed within or occluded in the matrix or;
3. a component of the matrix material, such as a metal sulfide.

The present invention renders such desired metal values accessible to recovery treatment in the sense that biooxidation of the sulfur content either exposes the elemental metal or compound for further recovery treatment or it also renders the desired metal values soluble or otherwise accessible to recovery treatment.

The present invention has preferable value in the recovery of gold from low gold content gold ore materials having a sulfidic sulfur content and more preferably in those instances where the matrix material comprises an iron-sulfur compound. Of particular interest are low gold content refractory pyritic and arsenopyritic gold ores.

While the following discussion illustrates the application of the present invention to this metal value/matrix material system, it should be understood that the present invention has application to the following metal values:
Group IB metals of the periodic table of elements (CAS version)
(copper, silver, and gold);
Group IIB metals
(particularly zinc);
Group IVA metals
(germanium and lead, particularly lead);
Group VA metals
(particularly arsenic and antimony)
Group VIB metals
(chromium, molybdenum and tungsten, particularly tungsten);
Group VIII metals
(iron, ruthenium, osmium, cobalt, rhodium, iridium, nickel, palladium and platinum, particularly, nickel, palladium and platinum) and
The Actinide series metals
(particularly uranium).
and to matrix materials that may contain these metals as inorganic metallosulfur compounds wherein the sulfur moiety conforms to the foregoing description.

It should be borne in mind in considering a gold metal value/pyritic or arsenopyritic matrix material system that the gold is present in the ore material in its elemental form dispersed within or occluded in the pyrite or arsenopyrite and that biooxidation renders the gold accessible in that the oxidation of the sulfur content and the iron content solubilizes the matrix.

In none of the references described in the Background of the Invention, relating either to the first stage bacterial biooxidation or the coupled second stage downstream cyanide or like extraction has there been a disclosure for forming specific particulates with a bacterial solution as suitable for low metal content ores treated in a heap; as well as for the biooxidation of low content gold ores. By "low" it is meant a gold-containing ore of less than about 0.07 oz/ton of ore. (While the present invention will be described in terms of its desirability in recovering gold from such low content gold ores, it should be understood that it has application to the previously described metals in other levels of metal value content.)

By the term "particles" it is meant the individual particles found in the ore such as run-of-the-mine ore; further, it is meant, ore particles formed after either primary or secondary grinding or crushing; by the term "particulates" it is meant the body or shape which is built up from the individual particles properly coated with an inoculant solution(s) containing bacteria; or from sulfuric acid containing solution followed by an inoculant solution containing a specific bacterium or bacteria of a specific undifferentiated strain or a mixture of bacteria. Such particulate design, construction or formation and the concomitant heap construction have especially desirable properties for the reactant, i.e. the biomass distribution, dispersal and access to: a) the metal values in an ore, particularly low-concentration metal values, or b) low sulfide and metal, particularly low-concentration metal values in an ore. None of the references discloses an economically attractive method for improving the proper initial construction of a heap, for biooxidation purposes, as well as to provide for a more efficient method e.g. cyanidation, for precious metal recovery downstream after biooxidation has taken place in the initially, properly constructed heap.

In its essential aspects, the present invention is directed to a biooxidation stage of an ore in the form of particulates with various pre-treatment and post-treatment steps related to the biooxidation. A subsequent precious metal recovery stage for extracting the precious and/or nonprecious metals from the biooxidized ore body is made now more advantageous because of the initial formation of the ore particulates with a bacteria coating which, as a result of improved biooxidation, makes the ores now especially amenable for the subsequent recovery, such as by cyanide or other extraction, of the desired metal value(s) from such biooxidized ores.

In accordance with the invention, a combination of steps is proposed which has interrelated a number of variables and has sought to reduce the rate limiting conditions for metal ore materials, especially for low precious metal content ore materials heretofore considered wastes and heretofore not capable of treatment for recovery of the precious metals therein such as in biooxidation tanks because of the low sulfur content. By low sulfur content it is meant ores of less than about 0.2 to 0.3% sulfide by weight. While the present invention, has been described with respect to low sulfur content with respect to the recovery of precious metal values such as gold, it is also amenable to use with higher sulfur content ores.

Thus, in accordance with the present invention and its preferred mode, waste materials having a gold content as low as 0.07 oz/ton and even as low as 0.02 oz/ton of gold in an ore may now be economically treated for recovery of the precious metal values. A preferred range is for ores of a gold content above 0.02 oz/ton of ore. Of course, the precious metal values, such as gold, in the ores significantly above the indicated threshold values are also recoverable but other means or options provide fairly attractive and economically competing alternatives which make the present process only a matter of choice in circumstances where such choice needs to be made.

Thus, it is considered practical in accordance with the present invention to treat tailings, waste material, or low grade overburden or previously exhausted dump material if the precious metal values in such ore bodies are at or above 0.02 ounces of gold per ton of ore or the monetary equivalent thereof in case of gold and silver or silver alone.

Still further, it has been found that the discovery, as disclosed herein, makes the process especially amenable to the low grade ores as a heap or dump treatment, with outstanding recovery rates for the metal values in the ores which are subjected to the herein disclosed method.

For example, the present invention contemplates the proper agglomeration of a distribution of fine and coarse ore material with the concomitant proper distribution of the biooxidant bacteria.

It is to be understood that within the body defined by the heap, particulates of different size characteristics and distribution are also contemplated as being an attractive feature of this invention, especially to provide for access to regions previously considered "dead" regions in a heap and now made accessible by the present process.

The above ore material particulates when properly formed and distributed in a heap provide the advantages because the inoculant biooxidant material is appropriately made to contact the individual particles and/or the smaller particles are appropriately layered on the larger particles to form the particulates. It is to be noted that agglomeration is only one of the methods for proper particulate formation and other equivalent methods shall become evident from the description of the desired particulates. Within such formed particulates or layers thereon are found the well established flora across the spectrum of the materials and thus the fine ore material particles provide an extremely attractive distribution of bioreactant bacteria over the entire ore body in a heap as defined by the various particulates formed also from unwanted, very small size particles called "slimes" in admixture with larger particles. The same and different bacteria may now be introduced in an appropriate location if dictated by temperature, pH, biocide, access, water drainage (i.e. water saturation) and like considerations. Further, this invention also concerns itself with proper particulate formation by agglomeration from crushed ores which are being heaped on a dump heap at the same time as these particulates are treated with an inoculant liquor containing the suitable bacteria for particular layers in a heap.

Other and various inoculation/particulate formation features of this invention will be disclosed in conjunction with the formation of the heap and the distribution of the biooxidant bacteria throughout the ore mass and the heap.

In connection with the above, pretreatment steps may be practiced such as acid treatment with sulfuric acid to neutralize or partially neutralize high acid consuming ores (thereby partially also agglomerating the ores), followed by the further inoculation and particulate formation and distribution of the biooxidant bacteria throughout the ore mass as it is being treated for deposition on a heap.

In accordance with the invention, the surface covering of the particulate with and the biooxidant bacteria distribution throughout are highly desirous. These features provide for an extremely advantageous access of the bacteria to the sulfide matrix in the ore in various size particles of the ore as well as for the rapid growth and multiplication of the bacteria. The preferential attack on pyrites, such as arsenic pyrites (arsenopyrites and/or arsenian pyrites) and the tailoring and design of subsequent or supplemental biooxidant leachant solutions now give a number of options to devise an optimum treatment for a particular ore.

Because of the possibility to have mixed biooxidant bacterial ore particulates in a heap, the ability to layer a heap, and to add various types of bacteria at various points in the particulate formation, the process provides for flexible and tailor made heap constructions. This flexibility also holds true for layering sequentially or conjointly with mutually compatible bacteria, thus offering different advantages and capabilities with respect to the ore material being treated, e.g. consortia for attacking other components in the ore, e.g. acid insoluble carbon. In this regard, reference should be made to the microbial agents and their method of use described in U.S. patent application Ser. No. 07/750,444, filed Aug. 20, 1991, now issued as U.S. Pat. No. 5,127,942, the disclosure of which is incorporated herein by reference.

Thus various bacteria that have outstanding characteristics for treating ore materials containing biocidally active metals, such as arsenic, antimony, cadmium and the like, in large quantities in conjunction with iron which is present, have provided for an advantageous intermixing of various cultures and at various points in the treatment cycle and in the heap body.

As a consequence of these advantages, short induction periods for growth have been experienced, better air and carbon dioxide accessibility provided, better nutrient infusion or supplementation practiced, more bio-mass is maintained throughout the heap, compacting and/or clogging are minimized, outstanding permeability is achieved, better percolation is achieved, puddling and/or channelling are minimized, water logging is avoided etc., etc. These and other advantageous features make the process very attractive due to the novel particulate design and heap construction resulting in an outstanding method for recovery of desired metals from metal ores, particularly precious metals from low content precious metal ores.

As one of the outstanding advantages of this invention, the first stage treatment steps have provided for down stream advantages for the recovery of the desired metal values, such as by a second stage, i.e. the cyanide or other lixiviant treatment for the extraction of the metal values or by recovery directly from the bioleaching solution. These second stage advantages result from inter alia, improved porosity associated and achieved with bioleaching, good permeation of lixiviant, etc. Other advantages are such as: relatively fast rate of extraction; a heap treated ore of outstanding accessibility to the cyanide material or other lixiviant or the bioleaching solution itself; reduced cyanide/lixiviant/bioleachant consumption; and other heap type advantages, e.g. regeneration of the lixiviant; flexibility to meet variations in the treatment; an ability to neutralize more easily a heap (if such is desired); the reduction of the neutralization requirements because of the attractive wash cycles (which have been found to exist as a result of the first stage heap treatment with the biooxidant material); and, other and further advantages mentioned herein.

Consequently, as one of the features of this invention, the reconstitution of the heap for cyanide treatment or other lixiviation has become economically attractive with the dispersed porous biooxidized matrix allowing for washing and attractive neutralization of the acidic heap material for the subsequent cyanidation or other lixiviation of the ore.

These and other advantages have further manifested themselves e.g. in that cyanocide fungi and other cyanide degrading microorganisms can now be readily used for the post treatment of the exhausted heap such as found in the disclosure in U.S. Pat. No. 4,402,831. The improved intra particle and inter particle accessibility allows cyanide elimination.

DETAILED DESCRIPTION OF THE INVENTION, THE FIGURES AND THE EMBODIMENTS THEREOF

With reference to the figures herein:

Figure 1:
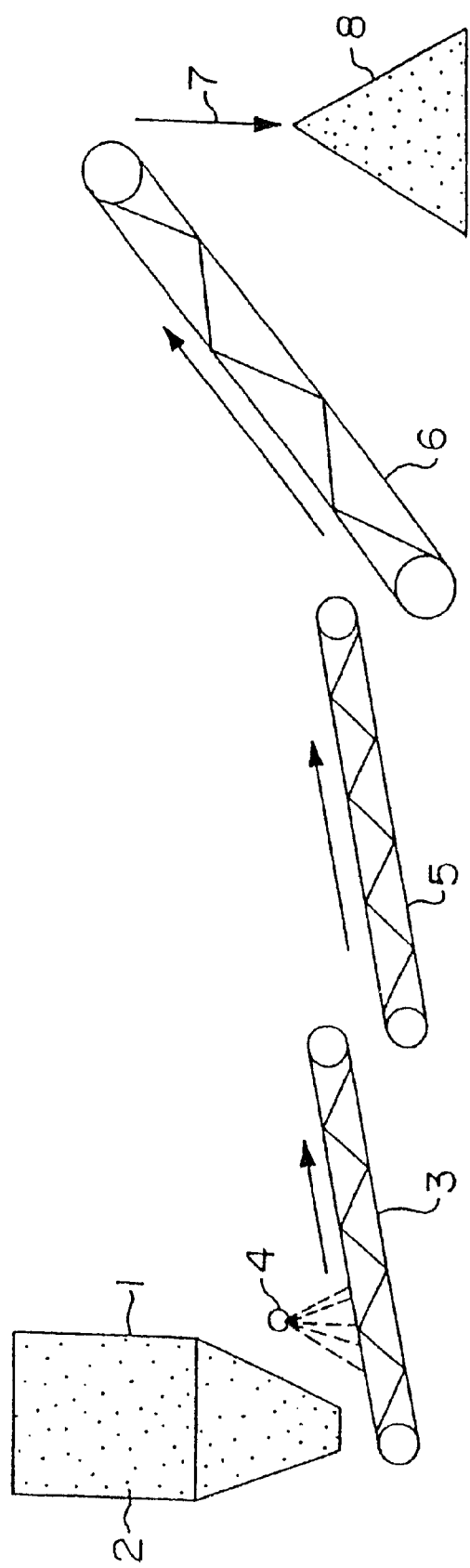
FIG. 1 shows a conveyor belt type of assembly for agglomerating particles of the desired characteristics for the formation of particulates in a heap for subsequent biooxidation and leaching of the metal values.

Referring to FIG. 1 in the drawings, a belt system is shown comprising a hopper 1 in which sulfide ore 2 is confined. The ore is fed onto an upwardly inclined conveyor belt 3 having a spray system 4 cooperatively associated therewith.

Conveyor belt 3 is arranged in overlapping tandem relationship with upwardly inclined conveyor belt 5 in turn it is arranged in overlapping tandem relationship with steeply inclined conveyor belt 6 from which particulates, which gradually form on the conveyor belts, are discharged at 7 to form heap 8.

Figure 2:
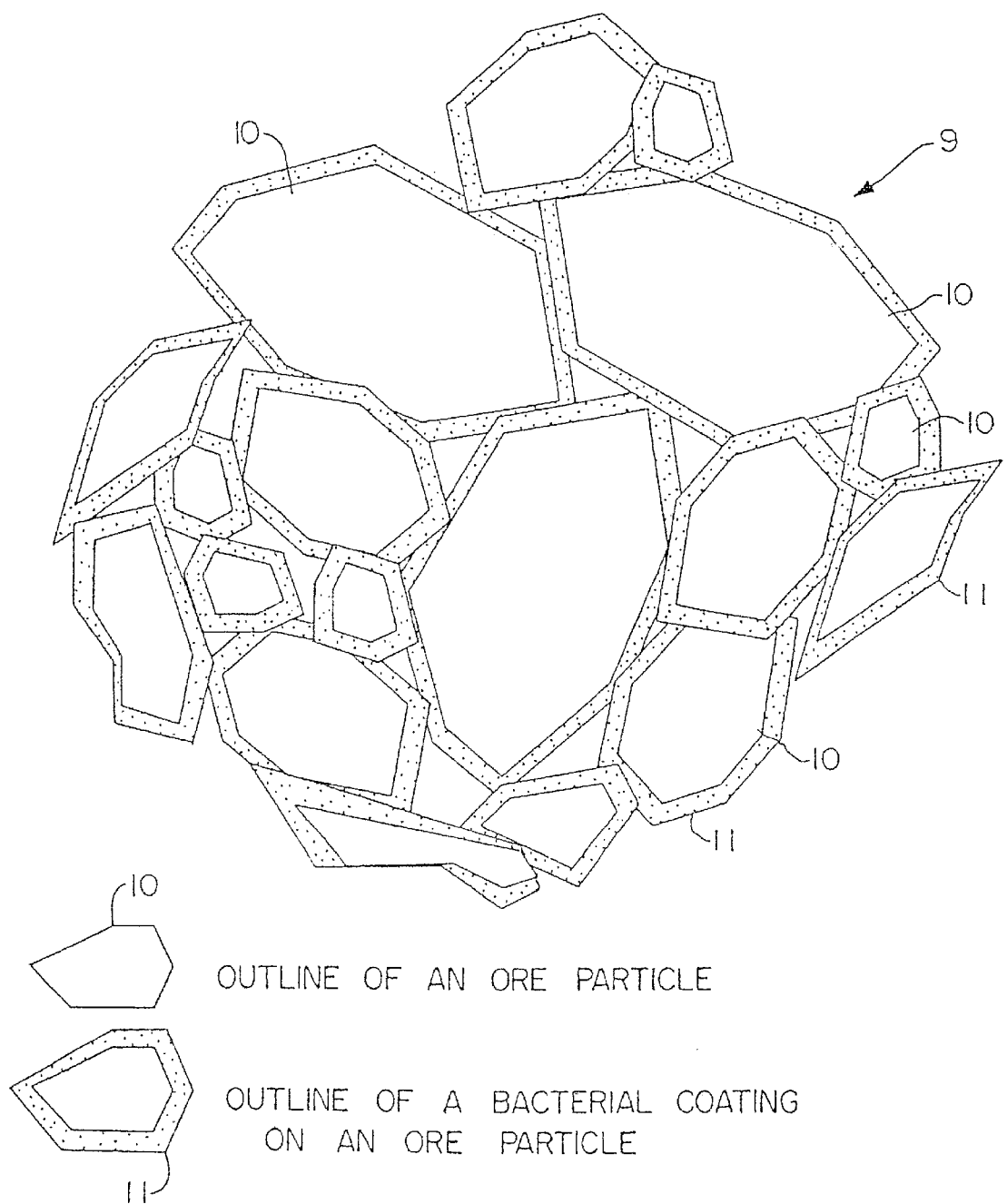
FIG. 2 illustrates a cross sectional area of an ore particulate made according to the illustration in FIG. 1.

In FIG. 2 a cross-sectional area of a particulate 9 is illustrated. As shown, individual particles 10 are covered with a bacterial coating 11. As each ore has different fracture characteristics, e.g. for ground or crushed or even run-of-the-mine particles, it is clear that various particles 10 will appear in these ores in different form. It is to be noted that while the exact mechanism is not known for the formation of the particulates, these particulates are sufficiently strong and resist significantly any compaction and/or resist being crushed in a heap by the weight of the material above the particulates. Typically for sulfide ores, the particulates should be about 1 inch and less with about 45% to 50% of the sulfides in the particulate being oxidized. An optimum size for sulfidic ores is about ½ inch to about ¼ inch allowing about 80% of the sulfides to be oxidized, (depending, of course, on the allowed time period).

For carbonaceous sulfidic ores, the size of the particulate should be about 1½ inches and less with about the same amount of sulfides being oxidized as for the sulfidic ores. The optimum lower end of the size range is about the same as for sulfidic ores.

For cyanidation, the particulates should be about 1 inch and less.

Also, for carbonaceous sulfidic ores, thiourea and thiosulfate lixiviants are less preg-robbing and are candidate lixiviants to be considered.

Figure 3:
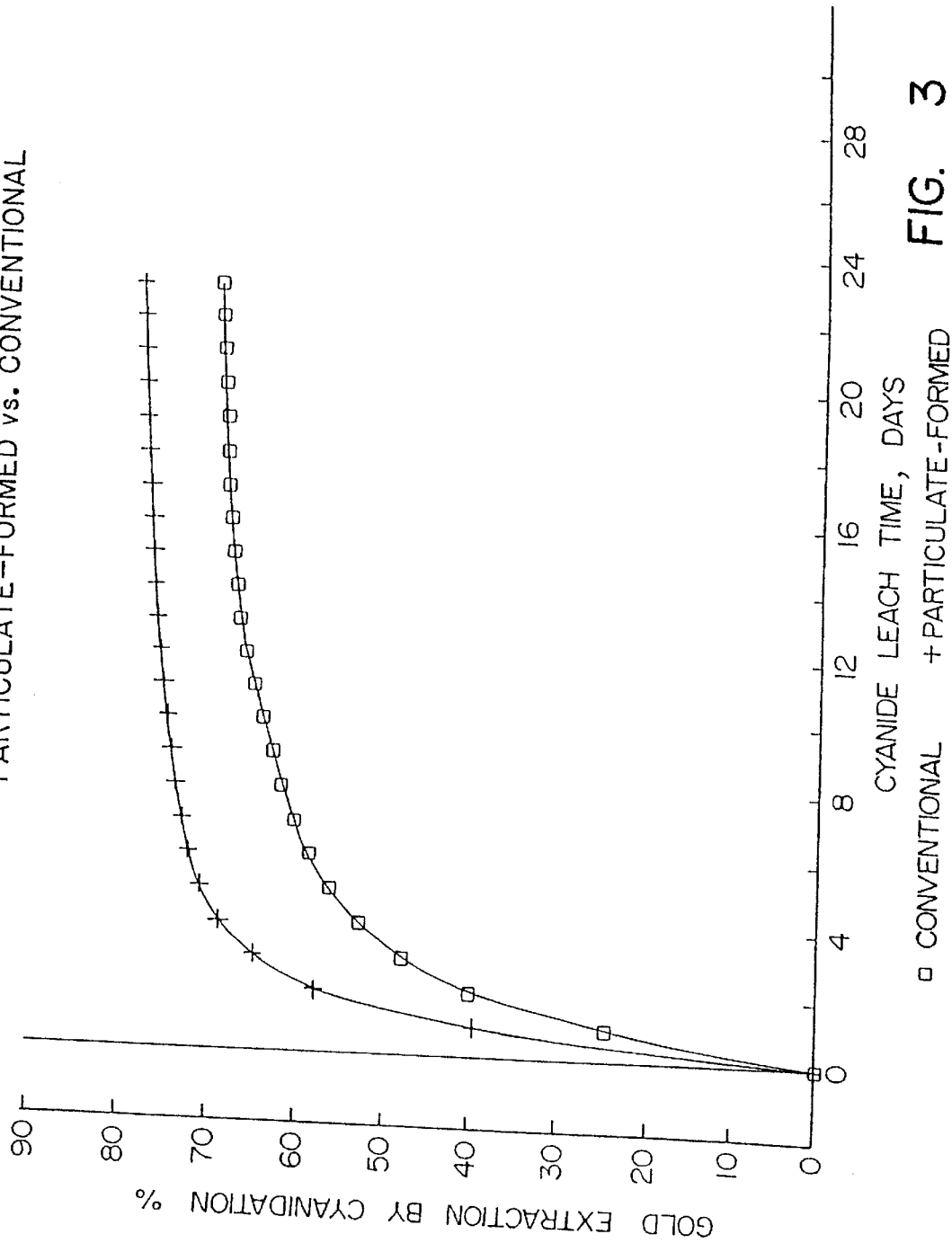
FIG. 3 is self-explanatory and shows for a representative ore the difference in results for the ores treated in accordance with the present invention as against ores treated according to a conventional process i.e., where the ore is biooxidized by spraying thereon a bacteria-containing solution.
Figure 4:
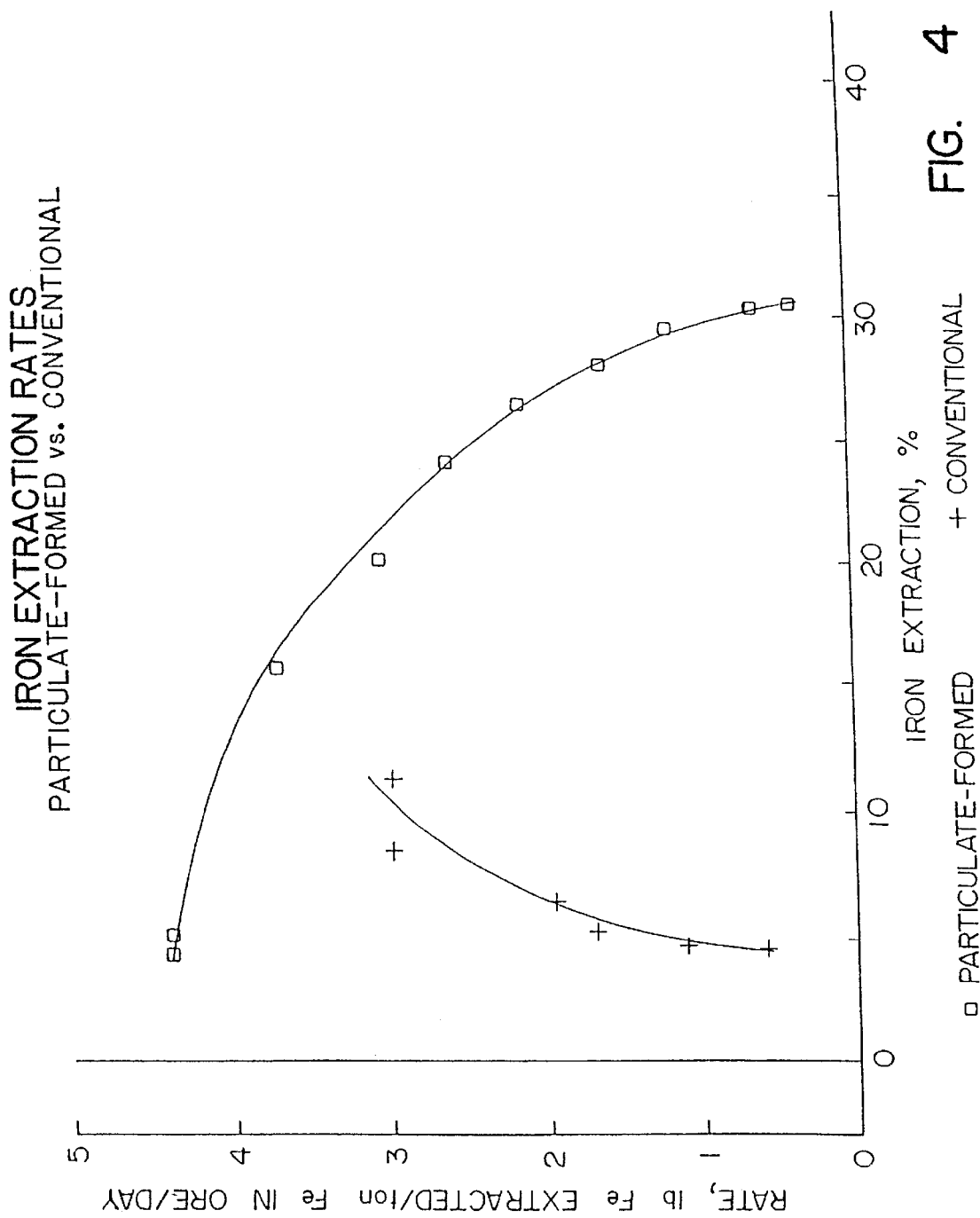
FIG. 4 is self-explanatory and depicts the advantages of the present invention based on the rate of extraction of iron from two samples of the same ore.

FIG. 3 and 4 illustrate appropriately improvements in rate limiting conditions according to the present invention and as to typical conditions encountered in the prior art.

Thus gold extraction is improved as shown in FIG. 3. The fast initiation and induction of a biooxidation for the invention herein is demonstrated by the rate of iron extracted as shown in FIG. 4 for the depicted, overlapping biooxidation/extraction periods.

Figure 5:
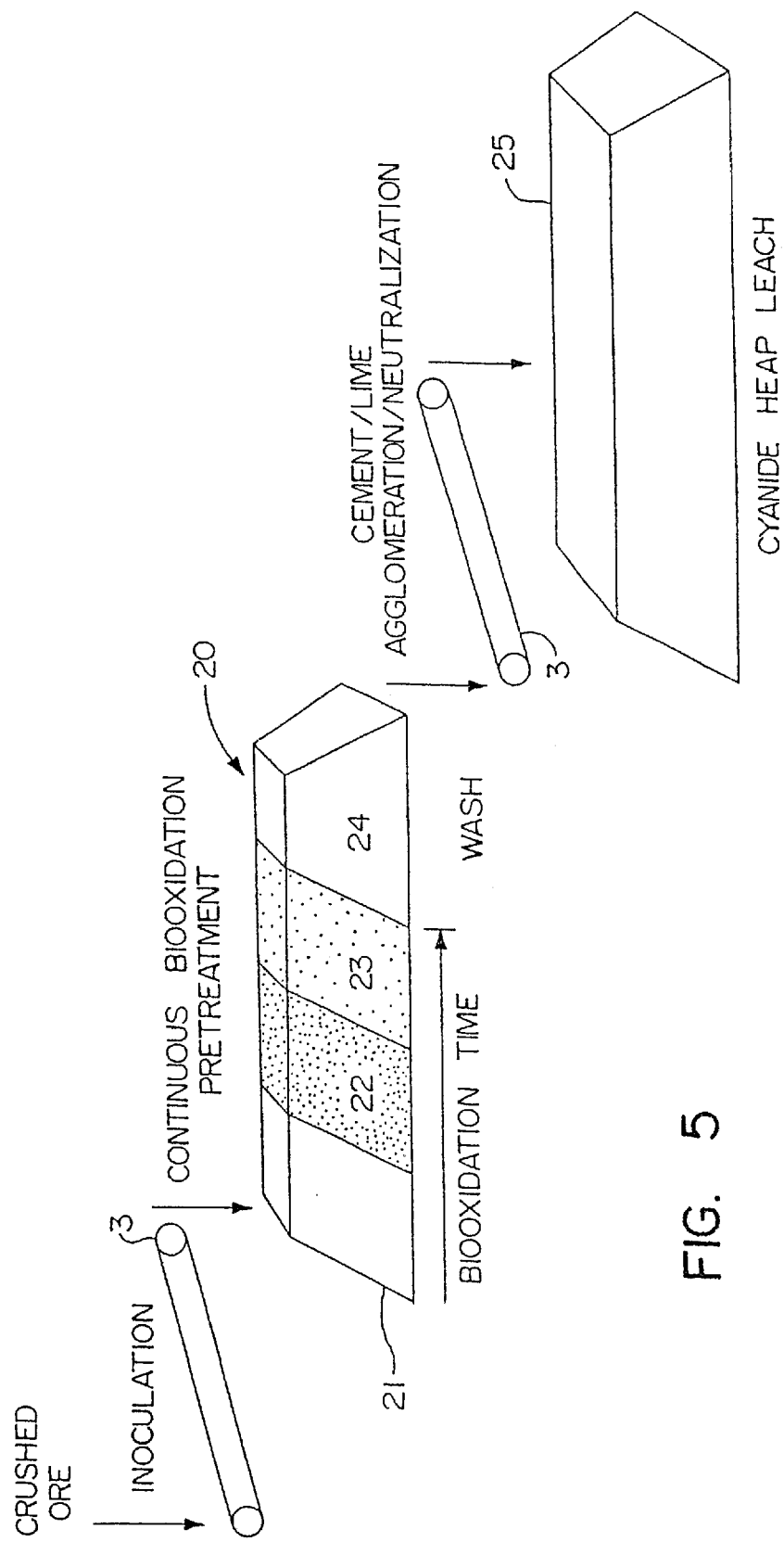
FIG. 5 illustrates schematically an embodiment of the present invention with respect to a heap of ore material being biooxidized and thereafter being reconstructed and cyanide treated.

In FIG. 5, a heap formed in accordance with the present invention is shown as 20. Heap 20 has an "induction" section 21 which is being freshly formed and represents schematically a lag time before a substantially significant biooxidation reaction starts. Section 22 of heap 20 illustrates schematically the heap in its most active biooxidation stage. Section 23 illustrates the heap in its mature biooxidation stage and corresponds schematically to a period during which a target biooxidized sulfide content in the ore is achieved. After that target has been reached, Section 23 is drained.

In its most active stage the heap may need to be cooled with a cooled, recycled biooxidant solution or a cooled maintenance solution, i.e. a nutrient solution.

After the target percentage of oxidized sulfide in section 23 of heap 20 has been reached and the heap has been drained, the heap is then washed for a prolonged period of time as schematically depicted by section 24 of heap 20. After a suitable wash period of e.g. 2 weeks or as determined by residual acidity or iron content target in the wash solution, section 24 is reconstructed by breaking it apart and by means of conveyor 3 the ore is reagglomerated with cement and/or lime to make a new heap 25 for leaching it with either cyanide or a thiosulfate solution.

Figure 6:
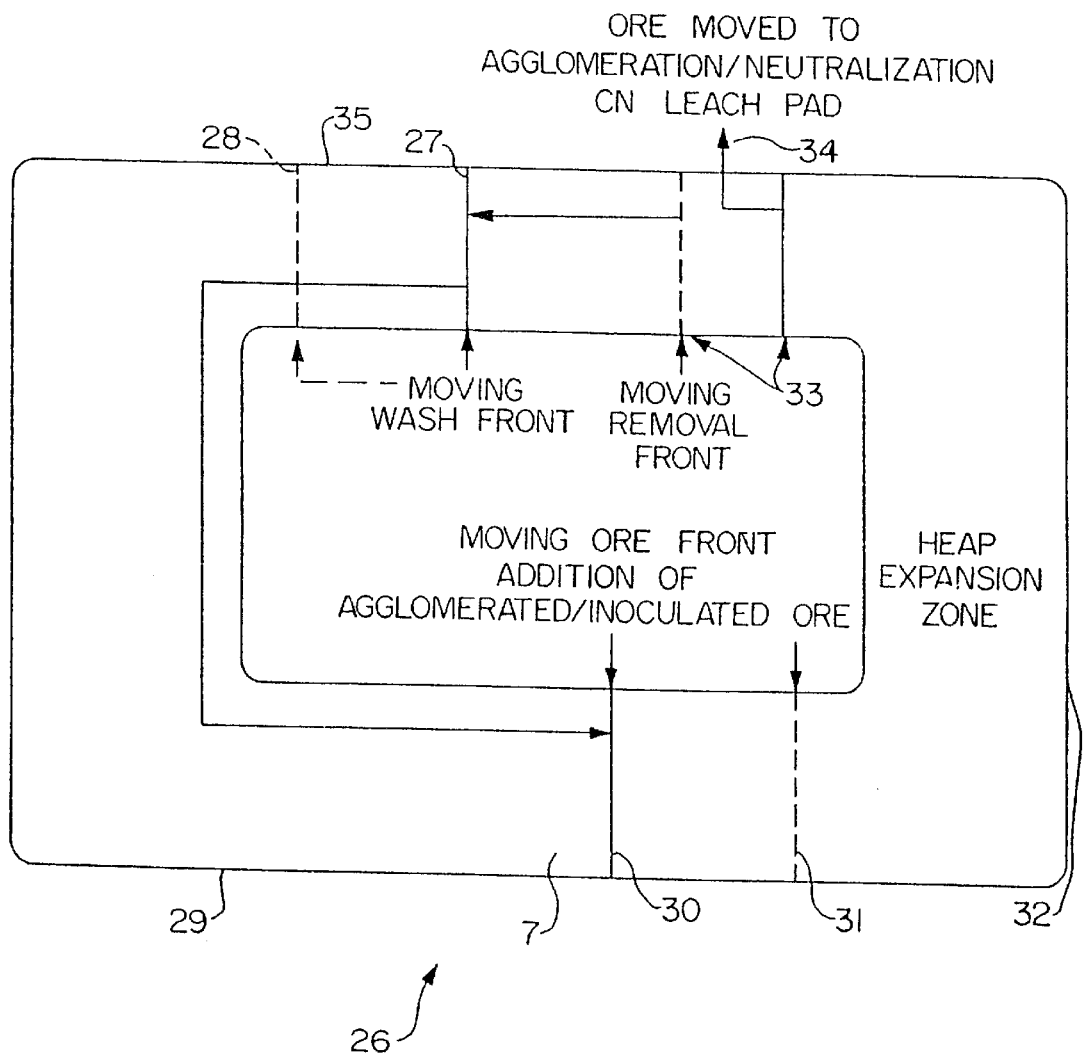
FIG. 6 illustrates another embodiment of the invention with respect to a heap of ore material being biooxidized in a "race track" fashion.

FIG. 6 illustrates schematically an embodiment which allows the practice of the invention in a more restricted area that is a "circular" heap 26 is constantly being formed and reformed. Thus the heap expansion zone 32 which represents an empty surface area, is gradually moving around the circle formed by the "circular" heap 26. As new layers of ore 7 are being added at face 30, the agglomerated/inoculated ore of the specific particulates gradually approaches the new face 31 of the freshly inoculated ore 7. From a correspondingly moving removal front 33, the ore is being taken away to a leach heap such as shown in FIG. 5 as 25. Likewise a moving wash front 27 and its corresponding new wash front 28 illustrate the wash section 35 being treated to reduce acidity of the biooxidized ore in the "circular" heap 26.

Figure 7:
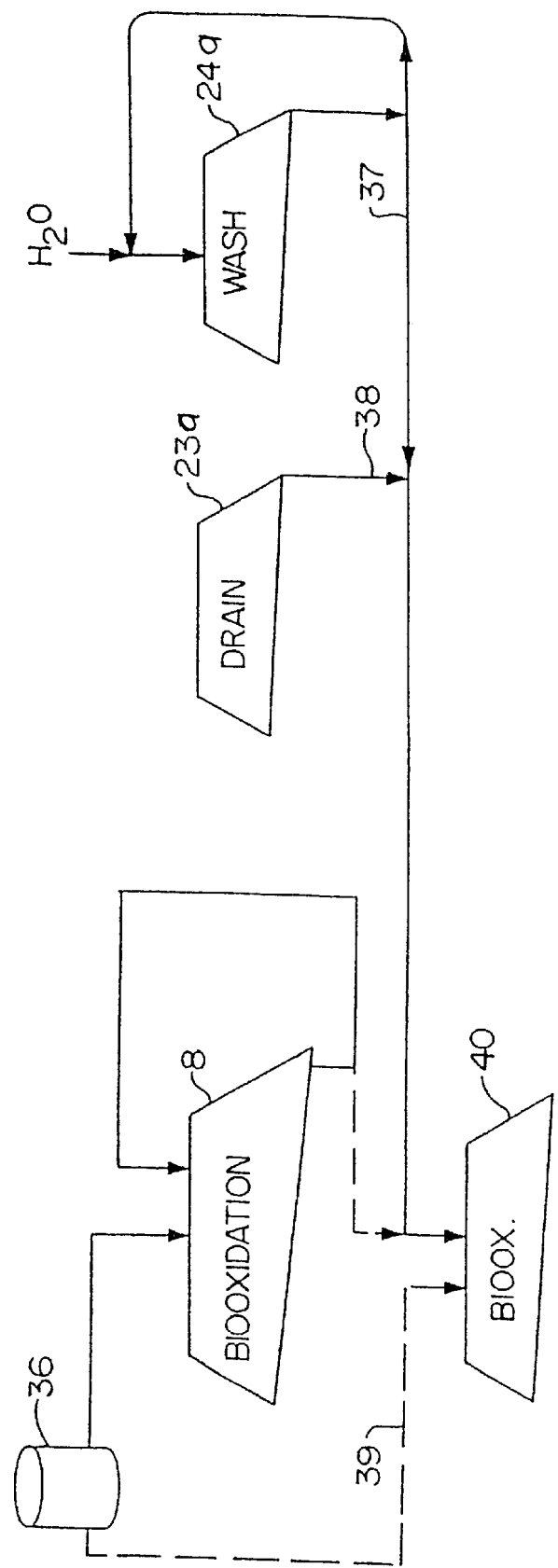
FIG. 7 illustrates a schematic of another embodiment for biooxidation leaching of an ore heap as well as a method for lixiviant and other solution management.

As shown in FIG. 7, a series of individual heaps may be operated for biooxidation. After the biooxidation reactions have been started in heap 8 and have been completed, the heap becomes heap 23a which is allowed to drain. A previously drained heap 23a is washed and is designated as 24a.

Waste water 37 from heap 24a is combined with drain solution 38 from heap 23a and also optionally with a slip stream from heap 8. Although new heap 40 particulates have been previously inoculated, if necessary, supplemental bacteria solution may be introduced in heap 40 which is undergoing biooxidation of sulfides in the ore material.

For the above embodiments, a heap in its biooxidation phase may be operated with a biolixiviant recycle of from 3 to 8 days and about 3 to 8 days of a rest cycle, such as a nutrient or a moisture maintenance cycle. About 4 to 7 days for lixiviant recycle and rest cycles provide suitable periods for keeping a heap operating it a desirable level of activity.

FIG. 7 thus illustrates the solution management for the entire biooxidation, drainage and wash sequence. It is evident from FIG. 7 that all solution values are being reutilized including the acid, ferric ion and drained bacteria. Such combination of solution utilization provides another advantageous aspect for the present invention. This solution management may be applied also to the embodiments illustrated in FIGS. 5 and 6.

With respect to the term "agglomeration", it is a method term; and, therefore, it is necessary that it be characterized more precisely in some fashion. Hence, for purposes of this invention it has been replaced with an appropriate description of particulate formation, size, size distribution and particle description in an ore body. These particulates are based on appropriate layering, nucleating and coalescing of the ore and the like particles to achieve in the formation of the particulates the desired particulate characteristics based on bacterial inoculation. The results are better porosity, permeability, percolation and liquid throughput. Further proper particulate formation as defined herein includes the inoculation, the "sticking" together of particles and the resistance to crushing of the particulate material as prepared in accordance with the invention herein.

Still further, for an easy measure of particulate formation as described herein, it is also defined herein in terms of the amount of liquid used to form the desired particulates and expressed as a moisture content range for a newly formed ore heap.

The mean rate of iron solubilizition in accordance with the present invention is another characterizing feature for establishing proper particulate formation of the ore material with the biooxidant bacteria material. A threshold iron solubilizition rate defines a value which is better than of an unacceptable particulate formed by an inadequate agglomeration. The foregoing indirectly characterized porosity and proper particulate formation.

Another method by which the proper particulate formation is defined is the lag time before a marker element appears in the leaching solution. Such marker elements and conditions have been defined herein with respect to a gold/iron-sulfur matrix system as total soluble iron, soluble ferrous iron, soluble ferric iron, the ratio of ferric to ferrous iron which should be greater than about 4:1 and preferably greater than about 3:1 soluble, arsenic, pH, and Eh. Further, the rate of leaching and the leaching solution introduction based on nutrient sufficient and nutrient starved solutions have also been shown. While iron has been used as a marker in the foregoing description, another metal that is solubilized by the biooxidation also is suitable as a marker.

Turning now to the ore preparation prior to particulate formation, the ore is a run-of-the-mine stock or has undergone crushing i.e. either primary or secondary crushing. The ore particles are of a size distribution that has been found to be more appropriate for particulate formation. Appropriately ground ores when used for proper particulate formation are selected so as to obtain the highest rate of biooxidation concomitant with most economic crushing of the particular ore. That is for easy-to-crush ores, the size is less e.g. ½ inch to minus ten mesh size but for hard to crush ores from 1 to ¼ inches. Typically an adequate void space is obtained from the above sized particles. Void space may be obtained by a combination of particle sizes of certain distribution, the particle shape and the shape of the formed particulates. Uniformly nearly round particulates with appropriate void space is a desideratum, but it is difficult to achieve this desired particulate and void space configuration for the heap. The reason for such difficulty is that the fracture characteristics of ores are different for different ores. Proper formation of the particulates tends towards rounder, layered particulates by the biooxidant bacteria solution whereupon smaller particles (each of which in turn are individually coated) are further increasing the surface to volume ratio. Hence particulate formation for biooxidation purposes serves the function of increasing surface area but more importantly achieving bacterially treated, increased surface area.

This physical-chemical reactant coaction has resulted in a particulate type that makes bioleaching a practical alternative and mikes it a practical method for heretofore considered waste materials of low metal, particularly low gold, and low sulfide content.

Added to the above particulate description is also the fact that biooxidant inoculation readily initiates the biooxidation reaction. That reaction contributes to a rapid direct, indirect and galvanic leaching. Thus, e.g. ferric sulfate produced by the biooxidation reaction accelerates the overall reaction and it thus becomes evident that occluded gold in the pyrite matrix is now so much more accessible to a second step leaching, e.g. cyanidation.

Alternatively, where the desired metal value is a component of the matrix material and biooxidation solubilizes that metal value, the biooxidant solution functions as a bioleachant and the desired metal value can be recovered directly from the bioleachant stream. In thus reducing the concentration of solubilized metal value in the bioleachant stream, when that stream is recycled through the heap the solublization of the desired metal value from the ore material is facilitated because of its lower concentration in the stream.

Inasmuch as ore crushing and grinding constitute the greatest part of the expense in formation of a heap, the process is desirably practiced with the largest ore particle size which may be economically justified as it concerns biooxidation. On an economic time basis, the penetrability of the bacterial solution and subsequent leachant solution and the formation of the particle into particulates (as it is now related to biooxidation) allows larger sized particulates, yet, particle size still has a significant role to play.

Proper ore crushing and particle size are achieved by means well known in the art such as disclosed e.g. in Perry's "Chemical Engineer's Handbook", 4th Ed., Chapter 8, McGraw-Hill (1973).

Appropriate particulate formation e.g. by agglomeration may be effected with ores having initial moisture content from about 2% to 3% such that the added liquid forms a total moisture content in the ore of about 8% to 12% at maximum. Higher amounts tend to produce unworkable mixtures.

Excess use of the liquid will only be wasteful unless the ore is conjointly mixed with a dry and fine ore and the particulates formed in the combination of the two. Moreover, use of ore "slimes", i.e. fine particles, may now be suitably employed in the particulate formation process.

However, it has been found that it is best that the particulate formation of the ore takes place in such a manner that the inoculation solution-caused build-up of layers or coalescence of particles is achieved in the most efficacious manner such as by the disclosed conveyors shown in FIG. 1 and like methods.

Other processes for particulate formation which may be practiced are such as disk type agglomeration devices well known in the art and as further disclosed in literature and handbooks, such as Perry's "Chemical Engineer's Handbook", 4th Ed., Chapter 8–57 et. seq.

An interesting approach to particulate formation is the method disclosed in U.S. Pat. No. 4,960,461 which suggests itself as another candidate method having suitability for the present purpose; however, it is noted that before the nip compaction takes place the liquid with its bacterial culture must thoroughly be distributed in the ore material.

For high clay content ores it may also be necessary to further add a binding agent, e.g. acid resistant polymers or copolymers for improving the binding i.e. "sticking", provided for by the bacteria-containing solution. Clay-containing ores are most difficult to bioleach as clay tends to absorb large amounts of water, clogs the channels and also is easily stripped from the particulates thus forming an impenetrable layer in the heap and causing phenomena such as "perched" water tables in a heap.

Typical particulate formation is by spraying of the liquid on the ore. Dipping into a liquid bath an ore conveyor belt and other means such as use of screw extruders and the like may be employed. It is important, however, that the moisture content and the particulate formation be such that the distribution of particles and sufficient surface area are achieved with the inoculation which provides for the fast reaction times, i.e. induction and oxidation of the sulfide reactants at economically acceptable rates.

For example, the present invention contemplates the proper particulate formation of a distribution of fine and coarse ore material particles with the concomitant proper and far better and more dense distribution of the biooxidant bacteria mass as shown in FIG. 2.

In accordance with the invention the following bacteria have been found to be useful. These bacteria are either available from American Type Culture or like culture collections or have been made available thereto and/or will be made available to the public before the issuance of this disclosure as a patent.

Group A. *Thiobacillus ferroxidans;*
　*Thiobacillus thiooxidans;*
　*Thiobacillus organoparus;*
　*Thiobacillus acidphilus;*
Group B. *Leptospirillum ferroxidans;*
Group C. *Sulfobacillus thermosulfidooxidans;*
Group D. *Sulfolobus acidocaldarius*, Sulfolobus BC; *Sulfolobus solfataricus* and *Acidianus brierleyi* and the like.

The above bacteria are further classified as either facultative thermophile, i.e. the microorganism is capable of growth at mid-range temperatures (e.g. about 30° C.) and high (thermophilic) temperatures (e.g. about 50° C. to 55° C.); or obligate thermophile which are microorganisms which can only grow at high (thermophilic) temperatures (e.g. greater than about 50° C.).

It is also desirable when applying the present invention to ore materials in which the desired metal value(s) and/or the matrix material comprises an inorganic metallosulfur compound in which the metal moiety is other than iron that bacteria may be utilized that also oxidize the selected metal.

For the above ore particulates to be usefully biooxidized, typically ores should have a certain mineralogy. The candidate ores should not contain more than 1% to 10% of calcite, dolomite, or other carbonate minerals and should have at least 0.2% sulfide present (all percentages and parts herein are by weight, unless expressed otherwise). The calcite carbonate makes the ores acid consuming and very refractory to treatment. These type ores should also have high sulfide content to generate the acid required for carbonate neutralization and sulfuric acid may have to be added to control the pH in a range suitable for biooxidation.

Appropriate bacterial biomass production may be practiced, e.g. as disclosed in U.S. application Ser. No. 07/695,945 filed May 6, 1991, entitled "High Yield Method for Growing *Thiobacillius ferroxidans* on Formate", now abandoned.

In accordance with the above description, a solution containing one or more of the above described bacteria in a biomass concentration from $10^5$ to $10^9$ bacteria per milliliter of solution is used for the formation of the ore particulates from particles in a manner such as to cover the particles with an appropriate layer of bacteria and thereafter, in particulate formation with fines adhering to a nucleus of the material. The build-up of subsequent small particles and particulate materials and the formation of these in a mass having a surface to volume ratio of at least 100 square centimeters per 100 cubic centimeters of ore provides a threshold measure.

Although longer leach times (slower rates) may be tolerated and the present invention contemplates such low leaching rates, the desirable, preferred method requires that at least an induction period of 5 to 10 days for the same amount of an indicator or marker should be displayed by the ore when treated to obtain a proper particulate formation.

It is to be noted that for Group A. and B. bacteria the useful temperatures should not exceed 35° C.; for Group C. bacteria these temperatures should not exceed 55° C.; and for Group D. bacteria the temperature should not exceed 80° C. Consequently, based on a temperature profile in a waste ore heap when oxidation of sulfides is in full swing and sulfide oxidation exotherm is highest, the heap may be bathed with cooled leachant or constructed with cooling (and/or heating) provisions. Further, the heap may be constructed with the appropriate bacteria to meet the temperature limits for such an ore, i.e. for high sulfide content ores. As it is well known and based on sulfide oxidation rates and concentrations, the temperatures in a leached heap are not uniform and the bacteria are often not able to survive if the temperature is not appropriately controlled or if the proper bacteria are not used. Therefore, the proper construction of a waste ore heap with the particulates formed with the proper thermophilic bacteria solution anticipates the encountered temperature in the ore body and thus is an advantage of the present invention.

Subsequent inoculation of the ore with additional and different bacteria may further accelerate the rate of reaction and is within the contemplation of the combination process disclosed herein. This inoculant use after heap formation further enhances the attractiveness of this process and makes it especially desirable when treating multi-metal containing ores having metals with biocidal properties. For example arsenic resistant strains may be used initially. Arsenopyrites are preferentially (time-wise) dissolved during biooxidation. However, leaching of arsenopyrites produces free or elemental sulfur. Hence, *Thiobacillus thiooxidans* may be used to remove the inhibitory effect of free or elemental sulfur. Also, high cyanide consumption occurs if free or elemental sulfur is present.

As disclosed above, the sulfide oxidation takes place at a pH of less than 2.5 and the operable range seems to be from about a pH 1.3 to about pH 2.0. Lower pH requires special bacteria such as *Leptospirillum ferrooxidans*. For the induction of the reactions, acid consumable components in the ore (which are well known in the art), should be taken into account. Acid consumption would retard or arrest the reaction by withdrawing sulfuric acid present.

Although the bacterial content for an ore material may be estimated such as by counting, by microscopy or end-point dilution (e.g., the Most-Probable-Number method), it is best that the progress of the reaction be monitored by the solubilization rate of arsenic or iron in the pyrites or the oxidation rate of the sulfides which may be calculated therefrom. Such monitoring is usefully demonstrated by reference to FIG. 4 from the curves shown in that figure. Other monitoring may be such as by measuring pH, determining titratable acidity, decrease of ferrous iron concentration, oxygen uptake, carbon dioxide uptake etc., etc.

While ultimately all tests for biooxidation efficiency must be based on the results obtained from data gathered in operating a heap, for relatively accurate comparisons, column test data are acceptable such as for an ore material biooxidized in a properly sized column. If it were not so, data gathering would be not only prohibitively expensive but also of an enormously long duration.

In order to aid the solubilization of metals, ferric sulfate may also be added to the reaction solution. An initial ferric sulfate component may be provided with the bacterial liquid used so that the reaction and the redox potential is initially established and immediately raised.

In the event acid pretreatment of ore is employed, the pretreatment may be interrupted before final particulate formation takes place. However, it is advantageous that the acid pretreatment and the particulate formation takes place at about the same time in a continuous sequence because of the high costs associated with reconstituting or rehandling such vast amounts of ore material. The costs associated with material rehandling may render the process economically unattractive.

After the ore particulates have been laid down on a suitable impervious base (and including a coarse drainage aiding layer of material) in a thickness from about 5 feet to about 300 feet, the leaching and/or nutrient supplementation is allowed to proceed as needed. A typical leach solution is of the following composition: from about 10 to 30 grams/liter total soluble iron (predominantly in the ferric form), from about 0.1 to 10 grams/liter arsenic as arsenate, from about 30 to 100 grams/liter sulfate. The heap is sprinkled or kept wet by drip irrigation such as with the leachant or with a nutrient solution. The last is comprised from about 0.4 to 30 grams per liter of $Fe^{3+}$; ammonium sulfate $(NH_4)_2SO_4$ from about 0.4 grams per liter initially, to about 0.1 gram per liter during the course of the operation. Additionally, about 40 parts per million (ppm) of phosphate is also added as the nutrient. Nutrient addition is monitored during the course of leaching and is changed, supplemented or augmented based on the selected performance indicators observed during the monitoring. When the heap is irrigated with either of the leachant or nutrient solution, oxygen concentration in either solution should be at least between 0.5 and 2 mg $O_2$/liter of solution.

The desired pH value is being maintained with sulfuric acid being added in order to work the heap with the solution being in the above indicated pH range of 1.6 to about 2.0. Because there is a certain amount of evaporation, the heap must also be maintained at a certain equilibrium moisture content found necessary for the location; such additions are provided during the course of reaction.

Because the heap is also non-repairable in a sense that rehandling of the materials is expensive, the previously described particulate formation and treatment conditions the heap in such a manner as to make for at very efficient biooxidation reactions when compared to the prior art typical tank, or vat methods carried out in slurry form involving liquid handling and liquid inoculation of the ore materials treated by biooxidation solutions. Moreover, the present invention allows treatment of ores of low sulfide content.

Likewise, the present invention differentiates from the typical biooxidation reactions in which the biooxidant solution is sprinkled or dripped on the heaps to develop the bacteria colonies over the period of time. Such prior art distribution is also very inefficient time-wise in that the dispersal and distribution is non-uniform. In such heaps, the bacteria tends to be concentrated only in the top one to two feet. Equilibrium conditions in such heaps are difficult to maintain and the reaction proceeds at a rate found to be incapable of duplicating the results which have been found herein. Bacterial survivability thus depends on only the top layers of an ore heap and the heap has large dead regions. For this reason, prior art bioleaching attempts have often been confined to forming of shallow heaps.

After reasonable equilibrium conditions are achieved following the induction period (the lag time), the progress of the biooxidation reaction, after maintenance cycle bioleachant additions, is monitored by appropriate markers which provide the direct or indirect indications for the oxidation rate of the sulfides and termination conditions. For example, arsenic and iron are being used as marker elements which define the oxidation of the sulfides based on the amount of arsenopyrite and pyrite sulfides being present. Inasmuch as the biooxidation reaction rate is controlled by the attachment of the bacteria to the ore, i.e. substrate, the present method provides for especially advantageous mechanism to overcome this rate limiting step when practicing the prior art conventional heap bioleaching process. Other reaction conditions which illustrate the diffusion efficiency of the biooxidant as well as reaction rate for the process herein are shown by the amount of other materials found in the solution as well as the ultimate extractability of the desired metal, such as gold. Other marker species which may be used are those typically found in conjunction with the desired metal, such as precious metals, for that particular ore and may be monitored for that purpose as befits the ore of the particular mineralogy.

With respect to the temperature at which the heap seems to operate optimally, it is based on the ambient conditions encountered in the area in which the heap has been formed. The interior of the heap resists exterior ambient temperature changes and varies very little except for the exothermic sulfide oxidation reaction. These exothermic temperature associated problems have been discussed previously.

The bioleachate is recycled at a rate from about 0.005 gallon per minute per square foot of top surface area for the ore body. A suitable rate varies from about 0.003 gal/min/ft² to 0.01 gal/min/ft². A preferred range for the rate is from 0.004 to 0.006 gal/min/ft². Dispersal of leachant may be achieved by well known means illustrated in the art for typical heap leaching processes but drip irrigation is preferred. In addition to solution application using drip irrigation, "wobblers" or spraying the solution may be advantageous. Spraying the solution on the heap can increase oxygen content in the solution, and this method can also be used to control excess solution through increased evaporation.

From experience, the sulfide oxidation achieved is about 50% to 60% on a time scale based on economic considerations. It is desirable, although not mandatory, to have as high degree of sulfide oxidation as possible. It is also desirable for any elemental sulfur content to be oxidized, particularly if it participates in the occlusion of the desired metal value(s). Inasmuch as the iron oxidation (or other selected metal oxidation) correlates to sulfide oxidation, the reaction can be reasonably well measured thereby. It has been found that at the lower end of the range about 50% to 60% of the sulfur remains in the ore and can still be tolerated. However, if the reaction rate is acceptable, higher sulfur oxidation is contemplated and may be of benefit in subsequent metal value(s) recovery, such as by cyanidation, as will be further discussed therein.

During the bioleachate recycle a slip stream may be provided for the removal of $Fe^{3+}$; typically about 30 grams per liter of $Fe^{3+}$ in the heap effluent is considered to be fairly well the upper limit. Thereafter, iron may start to affect the reaction rate because of inhibitory effects and if arsenic ions are present, these contribute to the inhibitory effect. As arsenic is a biocide, it is best that the amount of arsenic is not allowed to exceed about 14 grams per liter. The arsenopyrites are preferentially attacked by the biooxidant. If the bacteria are appropriately adapted and the bacteria had a chance to adapt themselves, which is a condition in nature in the high arsenic ore mines, then the reaction may proceed initially and thereafter with fairly large amounts of arsenic present. Hence, biooxidation contributes to the removal of excess unwanted arsenic. Arsenic may be removed by coprecipitation with iron under suitable conditions. Typically, arsenic as arsenate ($As^{5+}$), and iron, as the ferric species ($Fe^{3+}$), will coprecipitate when the solution ratio of Fe:As exceeds 4:1 and the solution pH exceeds 3. Lime is used to raise the solution pH to facilitate the coprecipitation reaction. The resulting ferriarsenate is reportedly a very stable compound with little tendency to dissociate. Also, the presence of ferriarsenate and iron arsenates in general causes high cyanide consumption.

Similarly in systems in which another metal is bioleached, a slip stream may be provided for the removal of that metal and its recovery. Further, the entire bioleached stream may be treated to recover that metal. In each of these instances the recovery of the desired metal is made directly from the bioleachate stream and metal recovery is made a part of the biooxidation/bioleaching stage and a separate recovery stage is not needed. Suitable techniques for recovery of desired metal values from bioleachate solution before recycle are:

1. precipitation;
2. solvent extraction and/or
3. ion exchange

After the biooxidation reaction has come to in economically defined end point, the heap may be then be drained and washed out by repeated flushing with water. Generally about two weeks of washing is sufficient. Washout cycles and times are based on an appropriate marker element such as iron and the pH of the wash effluent. A target amount is about 500 ppm of Fe in the wash effluent.

Inasmuch as the solution inventory and solution handling is a sizeable part of the expense in heap leaching, it is also important that the solution management is properly carried out as previously discussed in conjunction with FIG. 7. One aspect of the biooxidation-heap pretreatment process related to solution management is the use of the biooxidation recycle-solution as inoculant for particulate formation— with the recycle solution as an inoculant for new ore being modified as needed. The solution drained from the heap, prior to washing, will be acidic and contain bacteria and ferric iron. This solution can then be advantageously used for particulate formation with the recycle solution, i.e. inoculant solution of ore coming into the treatment process. In addition, the wash water will also contain the bacteria and ferric iron at an acidic pH and could be used if appropriately augmented, e.g. by leachant from the biooxidation stage for particulate formation and bacteria inoculation. This is a way to manage the solutions in the process and to decrease the need for waste water treatment until such time that inoculation is no longer required. For the present method, the solution management is vastly improved because of the fast reaction initiation rate and the faster leaching reaction. Consequently, less solution volume needs to be handled in order to achieve the equivalent amount of recovery when compared to a heap which has been traditionally prepared and bioleached and cyanide leached.

In addition to the leachant recycle and reuse, air and possibly carbon dioxide circulation may also be necessary which may be achieved by sparging into the leachant solution appropriate amount of air or oxygen or by directly injecting into the heap the appropriate amount of the gases. At higher oxygen amounts, e.g. at much greater than saturation level of about 8 mg/liter of solution oxygen also is inhibitory of the reaction. Typically, oxygen should not exceed 25 to 50 ppm of leachant.

As previously mentioned, besides the initial agglomerate biooxidation bacteria solution, a consortium inoculant solution may also be practiced as disclosed in a companion application. This disclosure is incorporated by reference and is found in Ser. No. 07/540,444, filed on Aug. 20, 1991, entitled "Microbial Consortium Treatment of Refractory Precious Metals Ores", now issued as U.S. Pat. No. 5,127, 942.

In practicing the process, one must guard against contamination of the system by extreme biocides, e.g. surfactants and anti-scaling compounds.

With respect to metal recovery by a separate leaching or lixiviation stage, after the post treatment and washing of the heap and after the heap has reached the desired pH range such as for thiourea extraction which may be practiced within a pH range from 1.5 to 2.0, the thiourea lixiviant is then introduced into the heap and the heap is being worked-up by the thiourea solution. Typically, about 0.1 gr/liter to 10 gr/liter of thiourea is used. A preferred range is from about 0.2 to 5 gr/liter in the lixiviant. Thiourea solutions may contain, as reducing agent, sulfite to improve thiourea leaching efficiency. Other agents which may be added are sulfuric acid for pH control and citric acid for thiourea stabilization. An appropriate thiourea leaching is described in U.S. Pat. No. 4,902,345, granted on Feb. 20, 1990 for "Treatment of Refractory Carbonaceous and Sulfidic Ores or Concentrates for Precious Metal Recovery"; and Brierley et al, "Enhanced Recovery of Gold from Refractory Sulfidic-Carbonaceous Ore Using Bacterial Pre-treatment and Thiourea Extraction", Gold '90 Symposium Proceedings, AIME, March 1990. The disclosure of these are incorporated by reference herein.

Thiourea is not as attractive a reagent as cyanide because the cost of the lixiviant material. Typically for thiourea leaching, the recovery of gold is not as high when compared to cyanide. Although the cost of reconstituting a heap for cyanide leaching may outweigh the disadvantages for thiourea leaching, it has been found that thiourea offers a number of advantages based on environmental considerations.

In a similar manner, a thiosulfate, e.g. ammonium thiosulfate or sodium thiosulfate, may also be used. Typically, an ammonium thiosulfate leachant operates in a pH range from about 8 to 10 and, preferably at a pH of at least about 9; and, therefore, the bioleached ore requires some neutralization. If direct neutralization is attempted such neutralization becomes extremely costly as well as likely to cause plugging of the heap by iron hydroxide formation. Hence, neutralization may be attempted by other means such as spoiling the heap and adding either cement or lime, or the mixture of the two to bring the heap within the pH range suitable for thiosulfate extraction. Thiosulfate solubilized gold is recovered by cementation or sulfide precipitation. Typically the cost for thiosulfate leaching is less than for thiourea but the thiosulfate leaching disadvantages are the cost of heap reconstruction and neutralization. These competing costs must then be balanced out in order to select the option which provides the advantages.

Cyanidation of the ore in a heap is also very attractive provided that the heap is properly reconstituted. According to the present invention, proper reconstituting of the heap is achieved with lime, Portland cement, caustic soda, cement dust or mixtures of these by thoroughly mixing the ore with the neutralizing agent and then agglomerating the ore. Because of the fairly high lime consumption, the neutralization reaction must proceed in a manner such as to improve the contact of lime with the still fairly acidic ore material. The ore is acidic despite its washing, and is in a pH range from 1.5 to 5. Neutralization is improved by breaking up the biooxidized heap and, by means of conveyor, or like devices reconstituting the heap. Advantageously it has been found that neutralization and reconstitution by appropriate particulate formation has certain advantages derived from the original biooxidation attributed to it by biooxidation and initial particulate formation (which has unexpectedly benefitted the subsequent extraction of gold by the cyanide). Such step-wise treatment and particulate formation has provided appropriate porosity, good percolation, good access by the cyanide ion, and the proper distribution of the lixiviant solution. It has been found that the void space and surface to volume ratios are about the same as for biooxidation but the lower limits are based on the values given above for biooxidation. The reconstituted heap is also aged or cured for about 1 to 2 days for it to function in a desirable manner.

After the heap has been treated with the cyanide solution for an appropriate length of time, typically based on a defined final limit amount of gold in the lixiviant solution, the heap may then be rendered dormant by washing or by the introduction of an appropriate fungi or other microorganisms which destroy the residual cyanide present in the heap. Cyanide degrading fungi are disclosed, e.g. in U.S. Pat. No. 4,402,831, granted Sep. 6, 1983.

In conjunction with cyanide treatment, the lixiviant may also have added thereto appropriate surfactants, oxygen or ozone or mixtures of these such as disclosed in the prior art. As for biooxidation, the same hold true for cyanidation—leach and rest cycles of the same order of length of time may be used to improve gold extraction. Similarly if a heap displays some disadvantageous clogging it can be opened up such as disclosed in U.S. Pat. No. 3,819,797.

Based on the above cyanide extraction, it is well known in the art to employ lixiviant solutions such as based on sodium cyanide or potassium cyanide. Recovery of gold is from about 35% to about 80% based on an analysis which includes the determination of gold in leach solution by atomic adsorption spectroscopy, fire assay of the leached ore residue and fire assay of the carbon used to recover the gold. In those instances where the desired metal value(s) are present as compound(s) dispersed within or occluded in a biooxidant matrix material and those compound(s) are not themselves biooxidized, the biooxidation has rendered those desired metal value(s) more accessible to recovery (having been freed of the matrix material to at least some degree.) The now-accessible metal value compounds are now amenable to further processing and metal value(s) recovery suitable for the compounds in which they are present.

In the examples to follow various aspects of the invention are further amplified and such amplifications are intended to be illustrations, but not limitations, of the invention disclosed herein.

EXAMPLE 1

A culture of *Thiobacillus ferrooxidans*, or a similar microorganism capable of iron oxidation and growth in acidic conditions, is grown in an acidic nutrient solution. A typical nutrient acid solution contains the following: 400 mg/l ammonium sulfate [$(NH_4)_2SO_4$]; 40 mg/l potassium phosphate dibasic ($K_2HPO_4$); 400 mg/l magnesium sulfate heptahydrate ($MgSO_4.7H_2O$); 33.3 g/l ferrous sulfate heptahydrate ($FeSO_4.7H_2O$), with a pH of 1.6 to 2.0 obtained by adjustment with sulfuric acid ($H_2SO_4$). The microorganism culture is grown for a period of three to ten days with aeration at a temperature of 20° to 35° C. in an amount sufficient to provide the solution required for particulate formation. The microbe-culture solution is applied to the ore to facilitate the previously described particulate formation.

EXAMPLE 2

Laboratory experimentation for evaluation of microbial pretreatment of refractory gold ore samples utilized the *T. ferrooxidans* culture medium (EXAMPLE 1) for particulate formation of the ore samples. Following this particulate formation, the ore was biooxidized in columns. Table 1 lists the parameters of the particulate formation/inoculation procedure.

TABLE 1

Particulate Formation of ore samples for biooxidation Pretreatment

| Ore Sample | Particulate Mean Size | Amount kg | Moisture % | Culture Medium Agglomeration liters |
|---|---|---|---|---|
| Sulfidic leach grade | −½" | 45.25 | 7.4 | 6.36 |
| Sulfidic mill grade | −½" | 45.35 | 7.4 | 6.367 |
| Sulfidic-carbonaceous leach grade | −½" | 48.65 | 7.0 | 6.367 |
| Sulfidic-carbonaceous mill grade | −½" | 46.15 | 7.3 | 6.363 |

The acidic particulate formation solution, containing the *T. ferrooxidans* and iron (7 to 8 g total Fe/l), was used at pH 2 to 3. The solution was added at about 0.08 l/kg of ore. The effect of the solution was to form the particulates from the fine particles of ore preventing plugging of the column and facilitating even solution flow.

EXAMPLE 3

Two 500 ton samples (A and B) of crushed ore (nominal size minus ¾ inch) were each used for forming the particulates using the culture medium (EXAMPLE 1) and *T. ferrooxidans*. About 5100 gallons of culture medium were used for the particulate formation procedure. Following the particulate formation, the ore samples were placed on asphalt pads for pretreatment by biooxidation to enhance gold recovery.

Ore A was substantially a gold-bearing quartz ore containing sulfur in the sulfide and sulfate form. The ore contained by weight 1% iron oxides, 4% jarosite, 10% alunite, 4% kaolinite, 4% sericite, less than 1% pyrite and the balance substantially quartz (about 73% or more). The gold content by fire assay came to 0.051 oz. per ton of ore. The cyanide assay for gold was 0.012 oz per ton of ore, thus indicating that a substantial portion of the gold was occluded within the ore and not free.

The total sulfur content of ore A was about 1.42% of which sulfate sulfur was about 1.22% and sulfide sulfur about 0.31%. The total carbon content was 0.16% which was acid insoluble. The remaining ingredients included 0.666% As and about 2.19% Fe.

Ore B comprised by weight about 1% iron oxides, 3% barite, 3% jarosite, 12% alunite, 6% montmorillonite, 4% sericite, 2% pyrite and the balance substantially quartz (over about 65%). The amount of gold by fire assay was 0.065 oz per ton of ore. Cyanide assay did not show the presence of free gold, thus, indicating, that substantially all of the gold was occluded in the ore and not freely available. The analysis also indicated that total sulfur was 2.31%, the sulfate sulfur being about 1.16% and sulfide sulfur about 1.15%. The total carbon content was about 1.27% of which 1.21% was acid insoluble. The ore also contained 0.035% As and a total content of 2.04% Fe.

EXAMPLE 4

The particulate formation from the ore particles (described in EXAMPLE 3) was accomplished by adding the bacteria culture to the ore on a conveyor belt as shown in FIG. 1. The culture solution was added at a rate of 16 to 20 gallons/1.67 tons of ore/minute. Two conveyor-belts plus a conveyer-stacker were used to provide transfer points to facilitate the mixing of the ore with the culture solution.

Inoculation

Effective bioleaching or biooxidation pretreatment requires the presence of an active bacterial population such as the *Thiobacillus ferrooxidans*. Recently mined ore generally does not contain a sufficiently large population of the bioleaching bacteria. In order to initiate rapid activity of the bacteria, and the treatment of the ore, it is necessary to inoculate the ore with the bacteria, particularly for a heap leach process containing a very large proportion of solids to leach solution.

It is preferred to inoculate the ore with microbes such as *Thiobacillus ferrooxidans* during the particle formation procedure. This has the advantage of distributing the bacteria on the ore particles and layering the particulates when these are placed in a biooxidation treatment heap. The inoculation process accelerates the initiation of active biooxidation.

EXAMPLE 5

Samples of sulfidic-carbonaceous gold ore (ore B) were used for forming particulates while inoculated (EXAMPLE 2) for column-test evaluation of biooxidation for enhanced gold recovery. One series of columns were used with formed particulates employing sulfuric acid and the microbes added after the ore was loaded in the column. A second series of columns were concurrently inoculated with *T. ferrooxidans* during the particulate formation procedure. The results (Table 2) indicate that concurrent particulate formation with an inoculation solution of bacteria of the ore increases the initial rate of biooxidation as indicated by iron solubilization.

TABLE 2

Inoculation and Particulate Formation to Facilitate the Biooxidation Process

| Inoculation | Biooxidation Time-Days (in series) | Biooxidation Rate % Fe Solubilized/Day |
|---|---|---|
| Microbes added to columns | 30 | 0.24 |
| | 30 | 0.28 |
| | 32 | 0.16 |
| | 30 | 0.30 |
| Particulates formed by use of inoculation solution | 29 | 0.33 |
| | 35 | 0.51 |
| | 33 | 0.41 |
| | 33 | 0.51 |
| | 33 | 0.42 |

The mean rate of iron solubilization from the ore which was treated with acid and then inoculated with the *T. ferrooxidans* was 0.24% Fe solubilized/day. The combined particulate formation with an inoculation solution resulted in an average of 0.44% Fe solubilized/day, an apparent increase of biooxidation rate of 83%. When the inoculation solution is used for particulate formation it also advantageously decreases the lag time, the time required for development of the critical bacterial population size for biooxidation of the ore as seen from the above data for iron solubilization after 30 days and 29 days respectively.

EXAMPLE 6

An experimental biooxidation test heap, containing a refractory sulfidic-carbonaceous gold ore (ore B), was set up for particle formation employing the process as described in EXAMPLES 3 and 4. The circulating leach solution draining from the heap was monitored for pH, Eh and total soluble iron as indicators of the activity of the *T. ferrooxidans*. The data (Table 3) indicate the presence of an active bacterial population and biooxidation.

TABLE 3

Biooxidation of Inoculated Refractory Gold Ore According to the Invention

| Biooxidation Time in Days | pH | Eh + mv | Total Soluble Iron g/l |
|---|---|---|---|
| 1 | 2.02 | — | 1.85 |
| 7 | 2.26 | 641 | 3.63 |
| 14 | 1.90 | 617 | 11.44 |
| 23 | 1.77 | 635 | 19.65 |
| 30 | 1.63 | 662 | 21.80 |
| 37 | 1.77 | 667 | 26.55 |
| 44 | 1.70 | 689 | 27.48 |
| 51 | 1.71 | 707 | 27.67 |
| 58 | 1.96 | 718 | 28.41 |
| 65 | 1.87 | 717 | 35.03 |

Eh or redox potential is defined as follows: Eh, or oxidation-reduction potential is a measure of a systems tendency to be oxidizing or reducing. The oxidation-reduction potential is measured electrically in reference to a standard substance, hydrogen ($H_2$). A system with a high positive Eh, such as the biooxidation solution, indicates that the solution will have oxidizing activity, in this case the oxidizing activity is due to the presence of ferric iron and the absence of ferrous iron (a reducing agent). The increased numbers indicate an increase in ionic concentration, e.g. of $Fe^{3+}$ in the solution.

The particulate formation of added *T. ferrooxidans* was of a concentration of about $10^5$ microbes/gram of ore particulates. Following a one-month period of biooxidation, the bacterial population had increased to $10^7$ microbes/gram of particulates. Visual inspection of the test heap indicated formation of a stable collection of particulates from the ore particles. The leaching solution, applied at a rate of 0.005 gal/min/ft$^2$, percolated rapidly through the test heap without any apparent ponding.

The leaching solution comprised initially of water plus nutrients acidified with sulfuric acid to about pH 2. Subsequently, only fresh water was used to make up evaporative loss.

An advantage of the invention is that the particulate formation process is effective on ore processed through primary and secondary crushing.

TABLE 4

Screen Analysis of Sulfidic-Carbonaceous Ore Used in Biooxidation

| Size Fraction, inches | Weight Percent Distribution |
|---|---|
| +1.50 | 17.70 |
| −1.50  +1.00 | 28.68 |
| −1.00  +0.75 | 11.57 |
| −0.75  +0.50 | 10.11 |
| −0.50  +0.25 | 12.13 |
| −0.25  +0.08 | 11.25 |
| −0.08 | 8.56 |
| TOTAL | 100.00 |

As a preferred embodiment, the ore may be −½ inch with at least about 50% of the ore −¼ inch and at least about 10% −10 mesh (U.S. Standard Screen).

Another preferred embodiment is to wash the particulates following biooxidation of the ore, disassemble the heap, and reconstitute the disassembled particulates with cement (e.g. Portland Cement) or cement plus lime as the binder to provide reconstituted particulates with a pH in the range of about 8 to 11, preferably 9 to 11 for subsequent cyanide leaching.

The amount of cement may comprise about 10 lbs. per ton of ore, or about 0.5% of the total weight of the ore. The amount of cement or other binder employed may range from about 3 to 15 lbs. per ton of ore.

Where the biooxidized ore ready for leaching is acidic, a thiourea solution may be used to recover the precious metals. A typical thiourea solution is one containing about 0.2 to 5 g thiourea/l having a pH generally ranging from about 1.8 to 2.4. Thiourea, however, is also effective over a pH range from 1.5 to 2.5.

EXAMPLE 7

Data were obtained on gold extraction in which the ore is biooxidized in accordance with the invention and was thereafter leached with a cyanide solution containing about 0.25 to 0.5 gpl of sodium cyanide at a pH of about 10. The solution may have up to about 5 gpl of sodium cyanide and the amount of cyanide may be dependent upon the amount of cyanide consumed by the biooxidized and neutralized ore.

Two types of ores were tested, one referred to as Newmont Post Mine and the other as Newmont Genesis Mine. Both ores were sulfidic non-carbonaceous ore.

The Post Mine ore contained by weight 2% barite, 1% jarosite, 5% kaolinite, 5% sericite, 2% pyrite and the balance substantially quartz (about 84%). The gold, sulfur and carbon contents were as follows: gold about 0.198 oz. per ton by fire assay, gold about 0.032 oz. per ton by cyanide assay, total sulfur about 1.61%, with sulfate sulfur about 0.38%, sulfide sulfur about 1.23%, total carbon about 0.23% of which 0.21% was acid insoluble, about 0.12% As, and iron about 1.68%.

The Genesis Mine ore contained 1% barite, 4% jarosite, 4% alunite, 13% kaolinite, 7% sericite, 2% arsenopyrite, 1% pyrite and the balance substantially quartz (over about 69%). The gold, sulfur and carbon contents were as follows: gold about 0.284 oz per ton by fire assay, gold about 0.083 oz. per ton by cyanide assay, total sulfur of 1.05%, with sulfate sulfur about 0.3%, sulfide sulfur about 0.75%, total carbon about 0.07% of which 0.02% was acid insoluble, about 0.51% As, and about 1.19% Fe.

Most of the gold was occluded in the ore since only 16% and 29% was cyanide soluble.

The mine samples of −½ inch size were formed in particulates with an acidic solution of *Thiobacillus ferrooxidans* and biooxidized in columns comprised of 100 lbs. of ore for each column.

The Post Mine sample was biooxidized for a period of 210 days. The bacteria oxidized about 64% of the sulfide in the ore.

The results obtained are given in Table 5 below:

TABLE 5

Gold Extraction from Refractory Sulfidic Ore Using
*Thiobacillus ferrooxidans* Culture with Biooxidation in Columns

| Ore Sample | Head Grade, oz Au/ton | CN leach ore residue oz Au/ton | Gold Extraction % |
|---|---|---|---|
| Post Mine sulfidic ore control | 0.196 | 0.132 | 32.6 |
| Post Mine sulfidic ore biooxidized | 0.201 | 0.073 | 63.7 |
| Genesis Mine sulfidic ore control | 0.284 | 0.178 | 37.1 |
| Genesis Mine sulfidic ore biooxidized | 0.284 | 0.074 | 73.9 |

In case of the Post Mine ore, the biooxidation increased gold recovery from 32.6% for the unbiooxidized ore or control to 63.7% for biooxidized ore.

With respect to the Genesis Mine ore, the biooxidation increased gold recovery from 37.1% for the unbiooxidized ore or control to 73.9% for the biooxidized ore.

Both tests confirmed the advantages of heap leaching particulates of sulfide ore without the necessity of using costly equipment.

The ore to which the present invention is applicable includes metal sulfide ores containing up to about 3 to 5% sulfur substantially combined as sulfide sulfur, the amount of gold in the ore occluded in the metal sulfide being greater than about 0.02 oz. per ton of ore, and generally greater than about 0.05 oz. per ton of ore.

Other and specific ores advantageously treated in accordance with the described process are: Gold Quarry sulfidic ore; Gold Quarry sulfidic-carbonaceous ore (requires coupling biooxidation with carbon deactivation process), Post Deposit sulfidic ore; Genesis Deposit sulfidic ore; Carlin Deposit sulfidic ore; Pete Deposit sulfidic ore; Salave sulfidic ore; Kirazli sulfidic ore; Atlanta Gold Deposit sulfidic ore; Homestake McLaughlin refractory sulfidic ore; and, ores from which bioleaching of metal values could be facilitated by the bioleach-heap process.

Amongst the ores specific candidate ores, the following typical ores are illustrative:

TABLE 6

Mineralogy of Candidate Ores

| Element | A | B | C |
|---|---|---|---|
| Gold, oz/ton | 0.55 | 0.26 | 0.11 |
| Sulfide, % | 4.14 | 3.33 | 1.66 |
| Iron, % | 3.51 | 3.48 | 3.62 |
| Arsenic, % | 5.34 | 0.18 | 0.47 |
| Carbonate, % $CO_2$ | 0.45 | 0.29 | 1.50 |
| Graphitic Carbon, % | 0.27 | 0.83 | 0.11 |
| Silica, % | 56.9 | 76.2 | 61.7 |

For purposes of illustration for forming particulates of the type as schematically shown in FIG. 2 above, Table 7 below is presented for two ores. It is to be understood that ultimately the proper particle size is that which functions best for each particular ore of its specific mineralogy for a) forming particulates and b) providing the most economical results for biooxidation and precious metal recovery. However, the present method description has provided one with a prescription of how to use properly an ore for forming a particulate with a bacterial solution.

TABLE 7

Ore Particle Size Distribution for Samples Used for Testing the Biooxidation-heap Pretreatment System

| | Weight Percent | | | Weight Percent | |
|---|---|---|---|---|---|
| Size | Sample A | Sample B | Size | Sample C | Sample D |
| +1.5" | 17.70 | 14.66 | +1" | 7.93 | 27.2 |
| 1.5 + 1" | 28.68 | 24.71 | −1 + ¾" | | 12.0 |
| −1 + ¾" | 11.57 | 11.14 | −1 + ½" | 67.37 | |
| −¾ + ½ | 10.11 | 10.70 | −¾ + ½ | | 12.3 |
| −½ + ¼ | 12.13 | 14.38 | −½ + ¼ | 16.91 | 16.3 |
| −¼" + 10 mesh | 11.25 | 14.54 | −¼" + 10 mesh | 5.07 | 16.3 |
| −10 mesh | 8.56 | 9.87 | −10 mesh | | 15.9 |
| | | | −10 mesh + 35 mesh | 0.95 | |
| | | | −35 mesh | 1.77 | |

A = Gold Quarry sulfidic-carbonaceous ore
B = Gold Quarry sulfidic-carbonaceous ore
C = Gold Quarry sulfidic-carbonaceous ore
D = Post Mine sulfidic ore Refractory sulfidic-carbonaceous ores, typical of the Gold Quarry deposit, are amenable to biooxidation to expose the sulfide occluded gold. However, the presence of the acid-insoluble ("organic") carbon, prevents economic recovery of the gold by cyanide leaching because of the affinity of the carbon for the gold-cyanide complex. Following biooxidation, the carbon must be deactivated to facilitate the cyanide leach of the gold. Because thiosulfate or thiourea lixiviants are less affected than cyanide by the organic carbon present in the ore, alternatively gold can be leached from the biooxidized sulfidic-carbonaceous ores with these lixiviants.

Kerosene is an agent which can "blind" the carbon surface to prevent adsorption of the gold-cyanide complex. The ore can be treated with kerosene, up to two gallons kerosene/ton ore, following the biooxidation step and preceding cyanidation. The carbon becomes sufficiently deactivated for improved extraction (e.g., from about 40% without kerosene to about 70% with kerosene) of gold with cyanide.

Surfactant blinding of the carbon reacts in a similar fashion to kerosene blinding. Certain anionic surfactants have carbon deactivation capability.

Hypochlorite (bleach) can also be used to deactivate the gold-sorbing carbon in ore following biooxidation. Cyanide extraction of gold can be increased from about 40% without hypochlorite to about 80% following hypochlorite treatment. However, there can be a very high consumption of the reagent hypochlorite, up to several hundred pounds/ton ore, if the sulfide is not completely oxidized. The more effective the biooxidation of the sulfide, the lower the hypochlorite consumption.

The preparation of the *Thiobacillus ferrooxidans* for the agglomeration/inoculation of the ore was done on site. A strain of the microbe was first grown at a laboratory. Three 50-gallon batches of the culture were then transported to the test site for inoculation of a solution in the culture preparation tanks.

Three 500-gallon tanks, each with a diffuser-aerator, contained about 360 gallons of the nutrient medium (previously described in the patent above) at an initial pH 2.2. Each tank was inoculated with the 50-gallons of *T. ferrooxidans* culture. Each tank was aerated (90 standard-cubic-feet/hour) using compressed air. The bacteria oxidized 98% to 99% of the ferrous iron during the first four days of incubation.

The bacterial culture from the respective 500-gallon tanks was used to inoculate three 5000-gallon tanks containing about 3600 gallons of nutrient medium. Each tank was aerated. Following two days incubation, 93% to 98% of the ferrous iron was oxidized. The three 4000-gallon batches of the culture were used for the biooxidation-heap test.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed:

1. A particulate of an ore material having a metal value and a matrix material having a sulfur content wherein the sulfur is present in an oxidation-reduction state of zero or less comprising
   a. a core particle of said ore material, said core particle having a size of less than about two inches; and
   b. a layer of particles of said ore material and an inoculate of sulfur biooxidizing bacteria in admixture with said particles
      wherein said particulate has sufficient strength to retain at least about 95% of a void volume for a column height of about 6 feet for at least 200 days when continuously bathed in a solution comprised of said inoculate or a nutrient therefor.

2. A particulate as defined in claim 1 wherein said layer of particles have at least 100 sq. cm of surface area for a volume of about 100 cubic centimeters.

3. A particulate as defined in claim 1 wherein said core particle has a mean average diameter of about ½ to about ¾ inches; and
   wherein said inoculate comprises an inoculate solution, comprising about 8 to 12% of the total weight of said particulate.

4. A particulate as defined in claim 1 wherein the particles of the ore comprise crushed ore passing a screen of ½ inch mesh size.

5. A particulate as defined in claim 4 wherein said crushed ore has admixed thereto at least 1% to 5% by weight of a slime, on a dry basis, for forming a layer on said core particle.

6. A particulate as defined in claim 1 wherein the particulate comprises at least about $10^5$ to $10^9$ bacteria per milliliter of inoculate for said particulate.

7. A particulate as defined in claim 6 wherein the bacteria is a mixture of *Thiobacillus ferroxidans* and *Thiobacillus thiooxidans*.

8. A particulate as defined in claim 1, wherein the particulate has a size of 1½ inch or smaller.

9. A particulate as defined in claim 1, wherein the particulate has a size of 1 inch or smaller.

10. A particulate as defined in claim 1, wherein the particulate has a size of from ¼ inch to ½ inch.

11. A heap comprising a plurality of the particulate of any one of claims 1–7 and 8–10.

12. A heap comprising a plurality of particulates of an ore material having a metal value and a matrix material having a sulfur content wherein the sulfur is present in an oxidation-reduction state of zero or less, each said particulate comprising a. a core particle of said ore material, the core particle having a size of less than about two inches and b. a layer of particles of said ore material and an inoculate of sulfur-biooxidizing bacteria in admixture with said particles wherein each of said particulate has sufficient strength to retain at least about 95% of a void volume for a column height of about 6 feet for at least 200 days when continuously bathed in a solution comprised of said inoculate or a nutrient therefor.

13. A heap as defined in claim 12, wherein a core of said heap is constructed of particulates with a bacterial inoculant of *Sulfobacillus thermosulfidooxidans*, or *Sulfolobus acidocaldarius, Sulfolobus BC, Sulfolobus solfataricus* or *Acidanus brierleyi*.

\* \* \* \* \*